(12) United States Patent
Takahashi et al.

(10) Patent No.: US 10,277,104 B2
(45) Date of Patent: Apr. 30, 2019

(54) ELECTROMAGNETIC CONVERTER, ACTUATOR, AND PUMP

(71) Applicants: Yuki Takahashi, Tokyo (JP); Yasutaka Kitamura, Tokyo (JP); Shigenori Inamoto, Tokyo (JP)

(72) Inventors: Yuki Takahashi, Tokyo (JP); Yasutaka Kitamura, Tokyo (JP); Shigenori Inamoto, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 255 days.

(21) Appl. No.: 15/271,370

(22) Filed: Sep. 21, 2016

(65) Prior Publication Data

US 2017/0093266 A1 Mar. 30, 2017

(30) Foreign Application Priority Data

Sep. 24, 2015 (JP) ................. 2015-187350

(51) Int. Cl.
*H02K 35/02* (2006.01)
*H02K 33/00* (2006.01)
*H02K 33/16* (2006.01)
*H02K 33/18* (2006.01)

(52) U.S. Cl.
CPC ............ *H02K 35/02* (2013.01); *H02K 33/00* (2013.01); *H02K 33/16* (2013.01); *H02K 33/18* (2013.01)

(58) Field of Classification Search
CPC ........ H02K 35/02; H02K 33/00; H02K 33/16; H02K 33/18
See application file for complete search history.

(56) References Cited

U.S. PATENT DOCUMENTS

| 2,832,902 | A | * | 4/1958 | Drescher | F41A 19/61 |
| | | | | | 310/15 |
| 5,066,204 | A | | 11/1991 | Point et al. | |
| 8,228,151 | B2 | * | 7/2012 | Schmidt | H02K 35/04 |
| | | | | | 310/12.12 |
| 8,624,447 | B2 | * | 1/2014 | Cartier Millon | G08C 17/00 |
| | | | | | 290/1 R |

(Continued)

FOREIGN PATENT DOCUMENTS

| DE | 8534210 U | 2/1986 |
| JP | 2013-021746 | 1/2013 |
| WO | 2015/162933 | 10/2015 |

OTHER PUBLICATIONS

Extended European search report for European Patent Application No. 16189949.7 dated Feb. 15, 2017.

*Primary Examiner* — Robert W Horn
(74) *Attorney, Agent, or Firm* — IPUSA, PLLC

(57) ABSTRACT

An electromagnetic converter that converts kinetic energy to electric energy, or converts electric energy to kinetic energy, includes a core configured to have a coil disposed; a magnet configured to be magnetically coupled with the core; a yoke configured to have the magnet disposed; a fixing portion configured to have the core and the yoke placed; and an elastic member configured to support the yoke, and to elastically deform so as to displace the magnet with respect to the core. Both ends of the elastic member are fixed to the fixing portion. The magnet and the yoke can rotate around an axis in an extending direction of the elastic member.

8 Claims, 14 Drawing Sheets

(56) References Cited

U.S. PATENT DOCUMENTS

| | | | |
|---|---|---|---|
| 9,013,084 B2* | 4/2015 | Ruff | E04B 1/21 |
| | | | 310/12.12 |
| 9,324,523 B2* | 4/2016 | Matsumoto | H02K 7/1853 |
| 9,754,748 B2* | 9/2017 | Tsuneyoshi | H01H 9/0271 |
| 2013/0010510 A1 | 1/2013 | Inada et al. | |
| 2016/0181878 A1* | 6/2016 | Suzuki | H02K 1/34 |
| | | | 310/38 |
| 2016/0314923 A1* | 10/2016 | Tsuneyoshi | H01H 9/0271 |
| 2017/0047835 A1* | 2/2017 | Takahashi | A61B 5/022 |
| 2017/0093266 A1* | 3/2017 | Takahashi | H02K 33/00 |
| 2017/0149321 A1* | 5/2017 | Kato | H02K 35/02 |
| 2018/0191231 A1* | 7/2018 | Saibal | H02K 35/02 |
| 2018/0294703 A1* | 10/2018 | Lin | B05B 12/002 |

* cited by examiner

ELECTROMAGNETIC CONVERTER, ACTUATOR, AND PUMP

CROSS-REFERENCE TO RELATED APPLICATIONS

This patent application is based upon and claims the benefit of Japanese Priority Application No. 2015-187350, filed on Sep. 24, 2015, with the Japanese Patent Office, the entire contents of which are hereby incorporated by reference.

BACKGROUND OF THE INVENTION

1. Field of the Invention

The present disclosure relates to an electromagnetic converter, an actuator, and a pump.

2. Description of the Related Art

For example, as an electromagnetic converter that converts kinetic energy to electric energy, or converts electric energy to kinetic energy, a power generator has been known that generates power by rotating a magnet with respect to a coil to change the magnetic flux penetrating the coil (Patent Document 1). A power generator according to Patent Document 1 has a structure that includes a single-pole magnetized magnet, and a shaft supporting mechanism to support the magnet, and to rotate the magnet with respect to the coil.

RELATED-ART DOCUMENTS

Patent Documents

[Patent Document 1] Japanese Laid-open Patent Publication No. 2013-021746

However, the electromagnetic converter described in Patent Document 1 includes the shaft supporting mechanism. Providing a supporting mechanism requires a shaft portion and a shaft bearing, which adversely affects the assemblability. Also, since a shaft sliding portion exists in the shaft bearing mechanism, reliability may be reduced due to friction.

SUMMARY OF THE INVENTION

An example of an object of an aspect in the present disclosure is to provide an electromagnetic converter, an actuator, and a pump of which the assemblability and the reliability are improved.

According to an aspect in the present disclosure, an electromagnetic converter that converts kinetic energy to electric energy, or converts electric energy to kinetic energy, includes a core configured to have a coil disposed; a magnet configured to be magnetically coupled with the core; a yoke configured to have the magnet disposed; a fixing portion configured to have the core and the yoke placed; and an elastic member configured to support the yoke, and to elastically deform so as to displace the magnet with respect to the core. Both ends of the elastic member are fixed to the fixing portion. The magnet and the yoke can rotate around an axis in an extending direction of the elastic member.

According to an aspect in the present disclosure, it is possible to improve the assemblability and the reliability.

DETAILED DESCRIPTION OF THE PREFERRED EMBODIMENTS

Next, embodiments will be described with reference to the drawings, which are just examples not intended to limit the present invention.

Note that the same or corresponding numerical codes are assigned for the same or corresponding members or parts throughout the mounted drawings, to omit duplicated description. Also, unless especially specified, it is not an object of the drawings to show relative ratios among members or parts. Therefore, specific dimensions may be determined by one skilled in the art with reference to the following non-limiting embodiments.

Also, the embodiments described in the following do not limit the invention, but are just examples, and not all features and their combinations described in the embodiments are necessarily essential to the invention.

FIG. 1 to FIG. 4 illustrate a power generator 10 as an embodiment of an electromagnetic converter.

Figure 1:
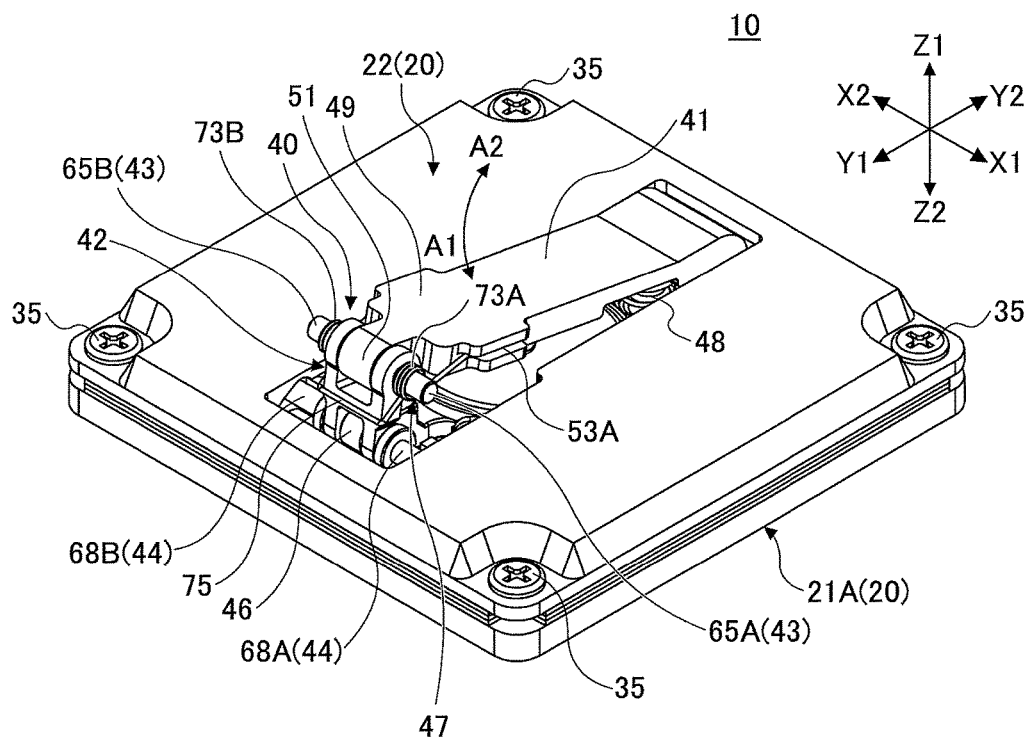
FIG. 1 is a perspective view of a power generator as a first embodiment of an electromagnetic converter.
Figure 2:
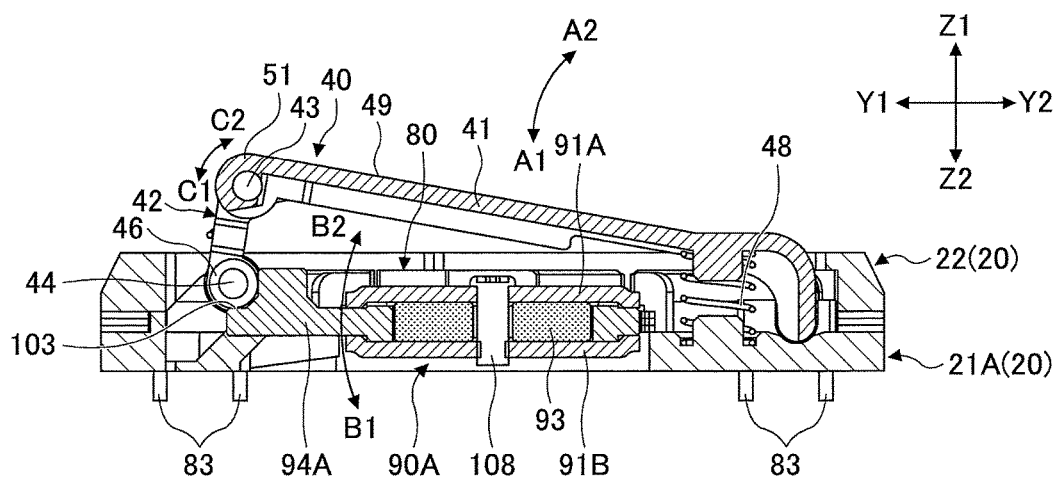
FIG. 2 is a cross-sectional view of the power generator as the first embodiment of the electromagnetic converter.
Figure 3:
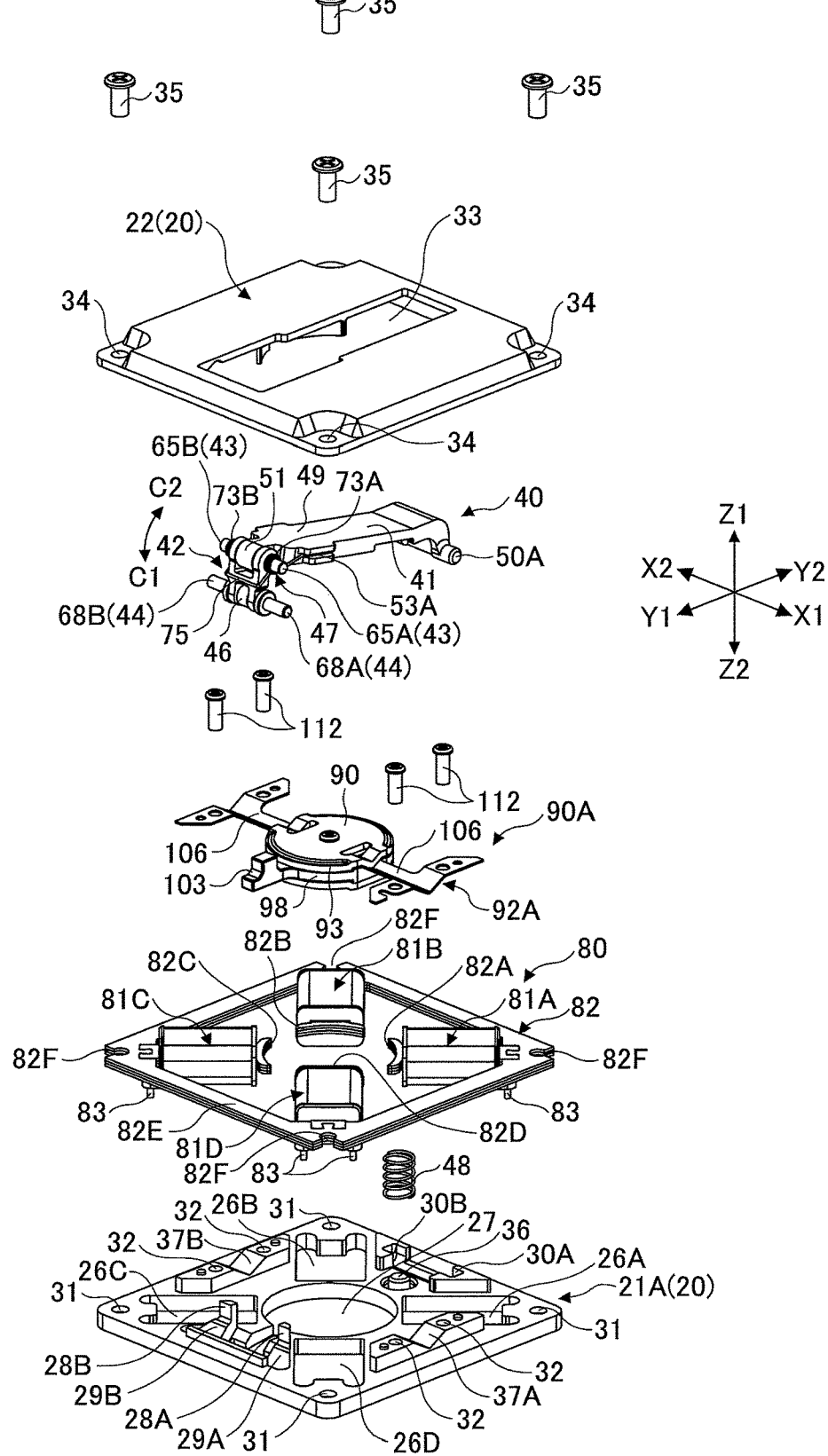
FIG. 3 is an exploded perspective view of the power generator as the first embodiment of the electromagnetic converter.

FIG. 1 is a perspective view of the power generator 10; FIG. 2 is a cross-sectional view of the power generator 10; FIG. 3 is an exploded perspective view of the power generator 10; and FIG. 4 a perspective view of the power generator 10 in a state where a top cover 22 of the power generator 10 is detached.

The power generator 10 includes a case 20, a switch unit 40, a coil unit 80, and a magnet unit 90A. This power generator 10 is configured to generate power by displacing the magnet unit 90 with respect to the coil unit 80 when receiving an operation on a switch lever 41 of the switch unit 40, and by changing the magnetic flux penetrating the coil.

The case 20 is a resin molding product, and includes a case body 21A and the top cover 22. In a space formed between the case body 21A and the top cover 22, the switch unit 40, the coil unit 80, and the magnet unit 90A are mounted.

The case body 21A has a rectangular shape, in which coil-unit mount portions 26A-26D, a magnet unit mount portion 27, standing walls 28A-28B, inclined walls 29A-29B, shaft bearing portions 30A-30B, and spring mount portions 37A-37B are formed.

The coil-unit mount portions 26A-26D have coil cores 82A-82D mounted, respectively, that are disposed in the coil unit 80. Therefore, the coil-unit mount portions 26A-26D have hollow shapes so that the coil cores 82A-82D are fit, respectively.

These coil-unit mount portions 26A-26D are placed on diagonal lines in the case body 21A. Specifically, the coil-unit mount portion 26A and the coil-unit mount portion 26C are placed to be positioned on one of the diagonal lines of the case body 21A having a rectangular shape, and the coil-unit mount portion 26B and the coil-unit mount portion 26D are placed to be positioned on the other diagonal line. Therefore, the coil-unit mount portions 26A-26D are configured to be placed at 90° intervals.

The magnet unit mount portion 27 has a magnet 93 mounted that is disposed in the magnet unit 90A. The shape of the magnet unit mount portion 27 is set to be greater than the shape of the magnet 93 so that the magnet 93 is configured to be movable in the magnet unit mount portion 27.

This magnet unit mount portion 27 is formed at the center of the case body 21A. Also, the magnet unit mount portion 27 in the embodiment is formed as a hole that penetrates through the case body 21A, but may be formed as a concave having a bottom part as long as movement of the magnet 93 can be secured.

The standing walls 28A-28B and the inclined walls 29A-29B are formed about the center of a side of the case body 21A (the side in Y1 direction). In other words, the standing walls 28A-28B and the inclined walls 29A-29B are formed between the coil-unit mount portion 26C and the coil-unit mount portion 26D. The standing walls 28A-28B and the inclined walls 29A-29B engage with engagement portions 68A-68B of the switch unit 40.

The standing wall 28A and the inclined wall 29A are formed to be integrated, and the standing wall 28B and the inclined wall 29B are formed to be integrated. The standing wall 28A is disposed on the upper part of the inclined wall 29A, and the standing wall 28B is disposed on the upper part of the inclined wall 29B. Also, the standing wall 28A and the inclined wall 29A, and the standing wall 28B and the inclined wall 29B are placed separate from each other in a direction designated by arrows X1 and X2 in the figure.

The shaft bearing portions 30A-30B are formed about the center of a side of the case body 21A (the side in Y2 direction) that faces the side where the standing walls 28A-28B and the inclined walls 29A-29B are formed. The shaft bearing portions 30A-30B engage with shaft portions 50A-50B that are formed in the switch lever 41 of the switch unit 40, and can rotate when engaged. Therefore, the switch lever 41 has its shaft portions 50A-50B supported by the shaft bearing portions 30A-30B, to have itself borne by the case body 21A.

The spring mount portions 37A-37B are formed to face each other via the magnet unit mount portion 27. The shaft bearing portion 37A is formed between the coil-unit mount portion 26A and the coil-unit mount portion 26D, and the shaft bearing portion 37B is formed between the coil-unit mount portion 26B and the coil-unit mount portion 26C.

The spring mount portions 37A-37B have a V-shaped hollow shape that corresponds the shape of a V-shaped spring portion 106 of a spring member 92A. Further, on both sides of the spring mount portions 37A-37B, screw holes 32 are formed into which fixing screws 112 are screwed to fix the spring member 92A.

Also, at positions of four corners of the case body 21A, screw holes 31 are formed into which screws 35 are screwed to fix the top cover 22. Further, at a position close to the magnet unit mount portion 27 and the shaft bearing portions 30A-30B, a boss portion 36 is formed to which a coil spring 48 of the switch unit 40 is attached.

The top cover 22 has an arm mount space 33 formed at the center, extending in the Y1-Y2 directions. Also, at the four corners of the top cover 22, through-holes 34 are formed through which the screws 35 are inserted.

The top cover 22 is disposed to cover the case body 21A that has the switch unit 40, the coil unit 80, and the magnet unit 90A mounted, and fixed to the case body 21A by having the screws 35 screwed into the screw holes 31 via the through-holes 34.

In a state where the top cover 22 is fixed to the case body 21A, the switch lever 41 of the switch unit 40 projects upwards from the top cover 22 through the arm mount space 33 (see FIG. 1 and FIG. 2).

Next, the switch unit 40 will be described.

The switch unit 40 includes the switch lever 41, an operational member 42, a coupling shaft 43, a guide shaft 44, a roller 46, and a torsional spring 47. This switch unit 40 has a function to transfer operational force (kinetic energy) applied to the switch lever 41, to the magnet unit 90A when operated.

The switch lever 41 is a resin molding product, and includes a pressing portion 49, the shaft portions 50A-50B, a shaft bearing portion 51, and hooking portions 53A-53B, which are formed to be integrated. The switch lever 41 has a nearly rectangular shape in plan view. Note that the material of the switch lever 41 is not limited to resin, but a material other than resin such as metal and the like may be used.

The shaft portions 50A-50B (the shaft portion 50B is not illustrated in the figure) of the switch lever 41, is formed at an end portion (the end portion in the arrow Y2 direction). The shaft portions 50A-50B are formed to project towards the outside from the sides of the switch lever 41.

These shaft portions 50A-50B are supported by the shaft bearing portions 30A-30B formed in the case body 21A when the switch unit 40 is mounted on the case body 21A. By having the shaft portions 50A-50B supported by the shaft bearing portions 30A-30B, the switch unit 40 can swing in a direction designated by arrows A1 and A2 in the figure, with respect to the case body 21A.

The shaft bearing portion 51 is formed at an end portion of the switch lever 41 on the side opposite to the side where the shaft portions 50A-50B are formed (an end portion in the arrow Y1 direction). The shaft bearing portion 51 has a through-hole formed, through which the coupling shaft 43 is inserted to bear the operational member 42.

The operational member 42 is formed by resin molding. Note that the material of the operational member 42 is not limited to resin, but a material other than resin such as metal and the like may be used.

The operational member 42 has a lower fork-shaped portion formed at the lower part (in the Z2 direction), and has an upper fork-shaped portion formed at the upper part (in the Z1 direction). Also, each of the fork-shaped portions has a through-hole formed that penetrates through in the X1-X2 direction in the figure.

The lower fork-shaped portion has the roller 46 mounted inside. After having the roller 46 mounted on the lower fork-shaped portion, the guide shaft 44 is inserted through the through-hole so that the roller 46 is borne by the operational member 42.

The shaft bearing portion 51 of the switch lever 41 has the upper fork-shaped portion inserted inside. Once the upper fork-shaped portion has the shaft bearing portion 51 mounted, the coupling shaft 43 is inserted through the through-holes of the upper fork-shaped portion and the shaft bearing portion 51. Thus, the operational member 42 is coupled with the switch lever 41, and the operational member 42 is configured to be capable of rotating in a direction designated by arrows C1-C2 in FIG. 2 and FIG. 3 around the coupling shaft 43 as the center, with respect to the switch lever 41.

In a state where the coupling shaft 43 is mounted on the switch lever 41 and the upper fork-shaped portion of the operational member 42, insertion portions 65A-65B on both sides of the coupling shaft 43 are configured to project towards the outside from the upper fork-shaped portion.

Also, in a state where the guide shaft 44 is mounted on the roller 46 and the lower fork-shaped portion of the operational member 42, the engagement portions 68A-68B on both sides of the guide shaft 44 are configured to project towards the outside from the lower fork-shaped portion.

The torsional spring 47 is configured to be formed of wound around portions 73A-73B and a coupling portion 75 by using spring wire, which are integrated. The torsional spring 47 is mounted on the switch lever 41 with the operational member 42 when the operational member 42 is mounted on the switch lever 41.

In a state mounted on the switch lever 41, the wound around portions 73A-73B of the torsional spring 47 are mounted on the insertion portions 65A-65B of the coupling shaft 43. Also, end portions 74A-74B are hooked on the hooking portions 53A-53B of the switch lever 41, and the coupling portion 75 engages with the operational member 42 on the outer surface (the end portion 74B and the hooking portion 53B are not illustrated in the figure).

By having the torsional spring 47 disposed between the switch lever 41 and the operational member 42, the torsional spring 47 elastically biases the operational member 42 inwards (in the arrow B2 direction in the figure). However, the operational member 42 has a projection disposed that is not illustrated in the figure, and by having this projection contact the switch lever 41, the operational member 42 is prevented from further rotating in the B2 direction beyond the position illustrated in FIG. 3 (the position at which the operational member 42 extends downwards nearly perpendicular to the switch lever 41).

The switch unit 40 configured as described above is mounted on the case body 21A, by having the shaft portions 50A-50B of the switch lever 41 attached to the shaft bearing portions 30A-30B of the case body 21A. When the switch unit 40 is mounted on the case body 21A, the coil spring 48 is interposed between the lower surface of the switch lever 41, and the case body 21A. The coil spring 48 elastically biases the switch lever 41 in a direction to be separated from the bottom surface of the case body 21A, around the shaft portions 50A-50B as the center.

Next, the coil unit 80 will be described.

The coil unit 80 includes coils 81A-81D and a coil core 82. The coils 81A-81D are configured to be formed of coil wire coated with an insulating material that is wound many times around respective holders made of resin. A terminal 83 is disposed at the lower part of each of the coils 81A-81D, and an end portion of the wound around coil wire is connected with the terminal 83 by soldering.

The coil core 82 is a stacked core having multiple silicon steel sheets stacked, and includes the coil cores 82A-82D and a frame object 82E. The coil cores 82A-82D are formed to extend inwards from positions of the four corners of the rectangular-shaped frame object 82E, respectively.

Specifically, the coil core 82A and the coil core 82C are placed to be positioned on one of the diagonal lines of the frame object 82E having the rectangular shape, and the coil core 82B and the coil core 82D are placed to be positioned on the other diagonal line. Therefore, the coil core 82A to the coil core 82D are configured to be placed at 90° intervals.

The coil core 82A to the coil core 82D have the coils 81A-81D mounted, respectively. Therefore, the coil 81A and the coil 81C are positioned on the one of the diagonal lines of the frame object 82E. Also, the coil 81B and the coil 81D are positioned on the other diagonal line of the frame object 82E. Therefore, the coils 81A-81D are also configured to be placed at 90° intervals. Further, the size of the frame object 82E is determined to correspond to the external shape of the case 20.

After the coil unit 80 has been installed on the case body 21A, the top cover 22 is fixed on the case body 21A by the screws 35 so that the frame object 82E is fixed in a state interposed between the case body 21A and the top cover 22. Note that on the outside of the positions of the four corners of the frame object 82E, insertion grooves 82F are formed to have the screws 35 inserted through.

In a state where the coil unit 80 is fixed to the case 20 (may be referred to as the "coil fixed state", below), the coils 81A-81D and the coil core 82 constitute a magnetic circuit together with the magnet 93 of the magnet unit 90A, which will be described later. Also, in the coil fixed state, the coils 81A-81D are fit in the coil-unit mount portions 26A-26D formed on the case body 21A. In this coil fixed state, internal end portions of the respective coil cores 82A-82D face the magnet unit 90, which will be described later.

Next, the magnet unit 90A will be described.

Figure 5:
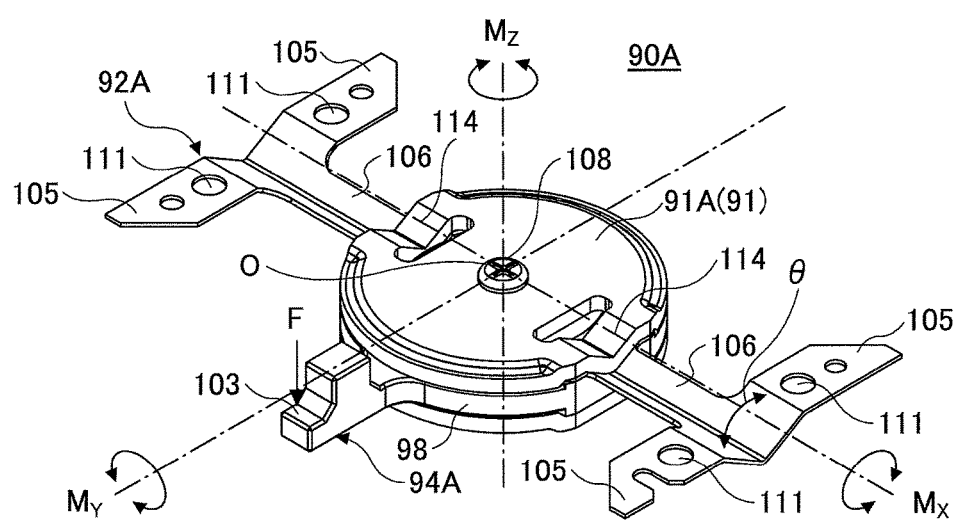
FIG. 5 is a perspective view of a magnet unit of the power generator as the first embodiment.
Figure 6:
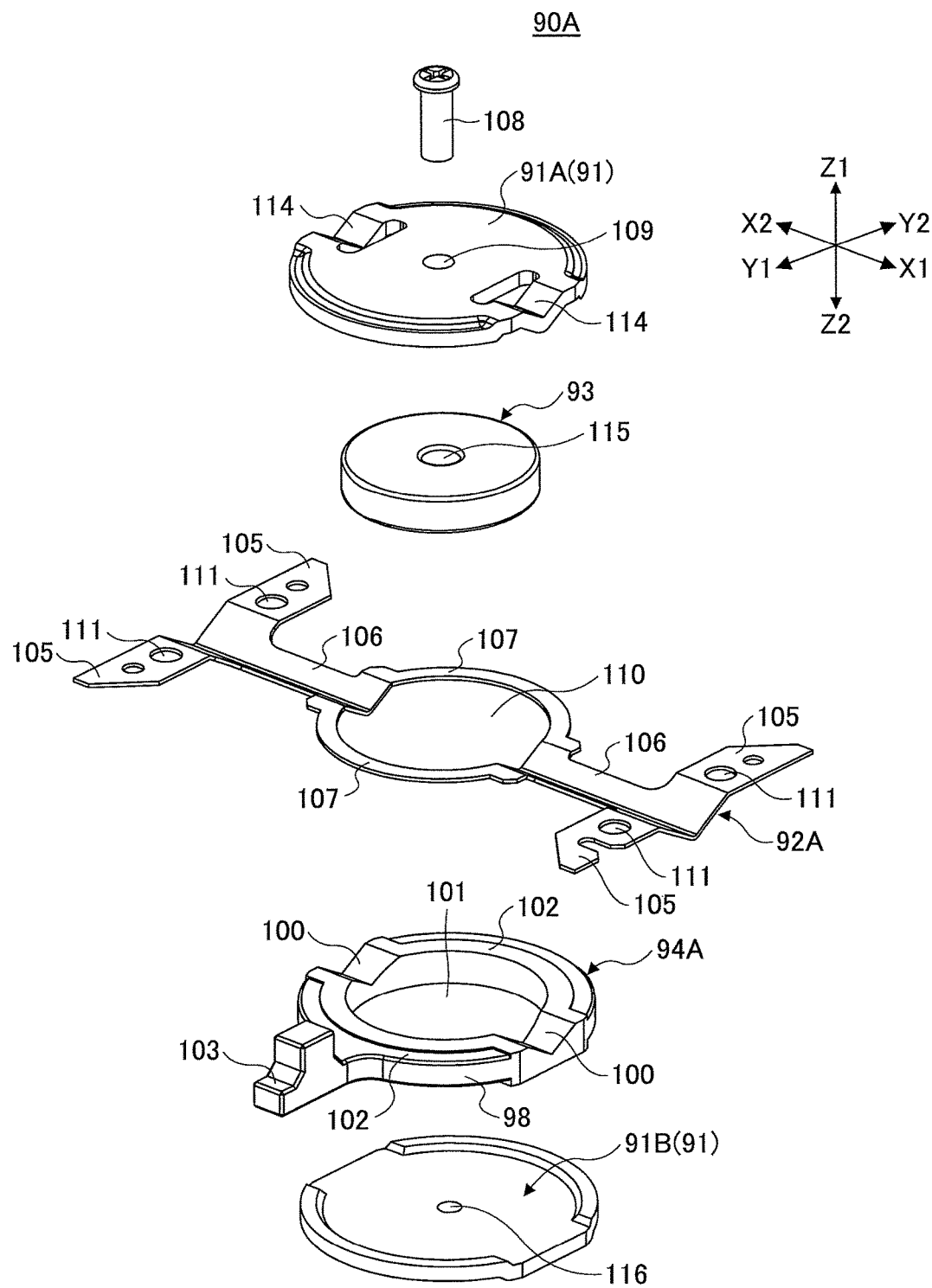
FIG. 6 is an exploded perspective view of the magnet unit of the power generator as the first embodiment.

FIG. 5 and FIG. 6 illustrate the magnet unit 90A. The magnet unit 90A includes a yoke 91, a spring member 92A, a magnet 93, and a movable member 94A. In a state where the switch unit 40 and the magnet unit 90A are mounted on the case body 21A, this magnet unit 90A is disposed at a lower part of the disposed position of the switch unit 40.

The yoke 91 is constituted with an upper yoke 91A and a lower yoke 91B. Both the upper yoke 91A and the lower yoke 91B are formed of a magnetic metal, and have a disk shape.

At the center position of the upper yoke 91A, a through-hole 109 is formed to have a fixing screw 108 inserted through. Also, positions on both sides of the through-hole 109, V-shaped projecting portions 114 are formed. The shape of the V-shaped projecting portion 114 is determined to correspond to the shape of the V-shaped spring portion 106 of the spring member 92A, which will be described later. Further, at the center position of the lower yoke 91B, a screw hole 116 is formed to have the fixing screw 108 screwed into.

The magnet 93 is a single-pole, disk-shaped magnet. This magnet 93 is magnetized to have N magnetic pole as one magnetic pole, for example, on the upper side in the figure (in the Z1 direction), and S magnetic pole as the other magnetic pole on the lower side (in the Z2 direction). Also, at the center position of the magnet 93, a through-hole 115 is formed to have the fixing screw 108 inserted through.

The spring member 92A is formed of a metal plate having a spring property by press molding, to integrate and include base portions 105, the V-shaped spring portions 106, and a holder portion 107. The spring member 92A has the yoke 91, the magnet 93, and the movable member 94A attached. Also, in a state having the yoke 91, the magnet 93, and the movable member 94A attached, the spring member 92A is fixed to the case body 21A. By having the spring member 92A fixed to the case body 21A, the yoke 91, the magnet 93, and the movable member 94A are elastically supported by the case body 21.

The base portions 105 are parts that are fixed to the case body 21A. The base portions 105 are formed to extend sideward from both end portions of the V-shaped spring portions 106 (the direction perpendicular to the extending direction of the V-shaped spring portions 106).

Each of the four base portions 105 has a through-hole 111 formed to have the fixing screw 112 inserted through. Positions at which these through-holes 111 are formed, are set to correspond to the positions at which the screw holes 32 of the case body 21A are formed.

The V-shaped spring portions 106 have a V-shape in side view (viewed in the X1 direction or the X2 direction in FIG. 3). A pair of V-shaped spring portions 106 are disposed having the holder portion 107 interposed. This pair of the V-shaped spring portions 106 are placed along a line. As will be described later, when the magnet 93 is displaced upon an operation on the switch lever 41, the V-shaped spring portions 106 elastically deform (bend), by which the magnet 93 is displaced with respect to the coils 81A-81D.

The holder portion 107 is a part interposed between the movable member 94A and the upper yoke 91A. The holder portion 107 has a ring shape to have an opening 110 formed. The size of this opening 110 is set so that the magnet 93 can be inserted inside.

The movable member 94A is molded by resin to integrate and include a main body portion 98, V-shaped concave portions 100, a magnet mount portion 101, holder-portion mount portions 102, and the opening 110.

The main body portion 98 has the magnet mount portion 101 formed at the center, to have a ring shape. The V-shaped concave portions 100 are formed on the upper side of the main body portion 98, and separated by 180° from each other. These V-shaped concave portions 100 have a shape corresponding to the V-shaped spring portions 106 of the spring member 92A. Also, the holder-portion mount portions 102 are formed on the upper side of the main body portion 98, except for the positions where the V-shaped concave portions 100 are formed. The holder-portion mount portions 102 has a shape corresponding to the holder portion 107 of the spring member 92A.

The hook portion 103 is formed to extend towards the outside from a predetermined position of the main body portion 98. The hook portion 103 is configured to engage with the operational member 42 (specifically, the roller 46) of the switch unit 40 when the switch unit 40 and the magnet unit 90A are mounted on the case 20.

To assemble the magnet unit 90A, first, the movable member 94A is placed on the lower yoke 91B, and the spring member 92A is placed on the movable member 94A. At this moment, the V-shaped spring portions 106 are set to engage with the V-shaped concave portions 100, and the holder portion 107 is set to engage with the holder-portion mount portions 102.

Next, the magnet 93 is inserted into the magnet mount portion 101 and the opening 110, and the upper yoke 91A is disposed to cover the upper part of the magnet 93. At this moment, the V-shaped projecting portions 114 formed on the upper yoke 91A are set to engage with the V-shaped spring portions 106. Next, the fixing screw 108 is inserted through the through-holes 109 and 115, the opening 110, and the magnet mount portion 101, and screwed into the screw hole 116 formed in the lower yoke 91B. Thus, as illustrated in FIG. 5, the upper yoke 91A, the magnet 93, the spring member 92A, the movable member 94A, and the lower yoke 91B are configured to be integrated.

In this integrated state, the V-shaped spring portions 106 are interposed between the V-shaped projecting portions 114 and the V-shaped concave portions 100, and the holder portion 107 is interposed between the holder-portion mount portions 102 and the upper yoke 91A. Therefore, the yoke 91, the magnet 93, and the movable member 94A are firmly fixed to the spring member 92A. Therefore, as will be described later, when the hook portion 103 is operated by the switch unit 40, and the movable member 94A is displaced accordingly, this displacement is securely transferred to the spring member 92A.

The magnet unit 90A assembled as above is fixed to the case body 21A. To fix the magnet unit 90A to the case body 21A, the V-shaped spring portions 106 are placed on the shaft bearing portions 37A-37B, and positioning is performed for the through-holes 111 formed in the base portions 105, and the screw holes 32 formed in the case body 21A. Then, the fixing screws 112 are inserted through the through-holes 111, and screwed into the screw holes 32, to have the magnet unit 90A fixed to the case body 21A.

Here, the direction in which the spring member 92A elastically deforms in a state where the magnet unit 90A is fixed to the case body 21A, will be described.

The base portions 105 of the spring member 92A are portions to be fixed to the case body 21A, and the holder portion 107 is a portion at which the yoke 91, the magnet 93, and the movable member 94A are attached. Therefore, elastic deformation of the upper yoke 91A mainly generates in the V-shaped spring portions 106.

The V-shaped spring portions 106 extend in the extending direction of the spring member 92A, in other words, extend in the longitudinal direction of the spring member 92A (X1-X2 direction).

Here, MX denotes an axis that passes through the center position of the magnet unit 90A (designated by an arrow O in FIG. 5) and extends in the extending direction of the spring member 92A. Also, MY denotes an axis that is perpendicular to the axis MX at the center position O of the magnet unit 90A on the surface the yoke 91 and the magnet 93. Further, MZ denotes an axis that is perpendicular to both the axis MX and the axis MY, and crossed at the center position O.

The V-shaped spring portion 106 whose cross section has a V-shape has a high rigidity in the rotational direction centered around the axis MZ, and a high rigidity in the rotational direction centered around the axis MY, and hence, the structure is hard to elastically deform in these axes. On the other hand, the V-shaped spring portion 106 has a lower rigidity in the rotational direction centered around the axis MX, compared to the rigidities around the other axes.

Therefore, by using the spring member 92A having the V-shaped spring portions 106, it possible to have the yoke 91 and the magnet 93 move only in the rotational direction around the axis MX as the center. In other words, the yoke 91 and the magnet 93 are configured to be capable of rotating only around the axis in the extending direction of the spring member 92A. Thus, it is possible to prevent unnecessary movement of the yoke 91 and the magnet 93, and to make the power generation efficiency higher when generating power.

Also in this case, it is desirable that the angle of the V-shaped part of the V-shaped spring portions 106 (the angle designated by arrow θ in FIG. 5, which may be referred to as the "V-shape angle", below) is greater than or equal to 90° and less than or equal to 120°.

The reason is as follows. If the V-shape angle is less than 90°, the V-shaped spring portions 106 get close to an overlapping state, and the rigidity of the spring member 92A in the rotational direction around the axis MZ as the center gradually becomes smaller. Also, if the V-shape angle is greater than 120°, the V-shaped spring portions 106 get close to having a plate shape, and the rigidity of the spring member 92A in the rotational direction around the axis MY as the center gradually becomes smaller.

In this way, if the V-shape angle is less than 90° or greater than 120°, the rigidities in the directions other than the direction in which the yoke 91 and the magnet 93 are to be moved, cannot be raised sufficiently. Therefore, the yoke 91 may move in directions that do not contribute power generation, and the power generation efficiency may be reduced. Therefore, it is desirable that the V-shape angle is greater than or equal to 90° and less than or equal to 120°.

In addition, while the V-shape angle becomes smaller, the height dimension of the V-shaped spring portion 106 (the dimension in Z1-Z2 direction) becomes greater. In this case, the depth of the V-shaped projecting portions 114 formed on the upper yoke 91A, and the depth of the V-shaped concave portions 100 formed on the movable member 94A also become greater, and hence, the magnet unit 90A become larger. Therefore, also from the viewpoint of making the magnet unit 90A thin, it is desirable that the V-shape angle is less than or equal to 120°.

On the other hand, the hook portion 103 formed on the movable member 94A extends in the direction of the axis MY that is perpendicular to the axis MX on the surface the yoke 91 and the magnet 93 (see FIG. 5). Therefore, if the hook portion 103 receives a pressing operation by the switch unit 40 in the direction designated by an arrow F in FIG. 5, a rotational force is generated in the spring member 92A around the axis MX as the center. Therefore, the V-shaped spring portions 106 elastically deform, and this elastic deformation of the V-shaped spring portions 106 makes the yoke 91 and the magnet 93 start rotating around the axis MX as the center, from a horizontal state before the pressing operation.

Note that if the pressing operation is released, the yoke 91 and the magnet 93 return to the horizontal state before the operation, by elastic restoring force of the V-shaped spring portions 106.

Next, power generation operations of the power generator 10 will be described.

Figure 4:
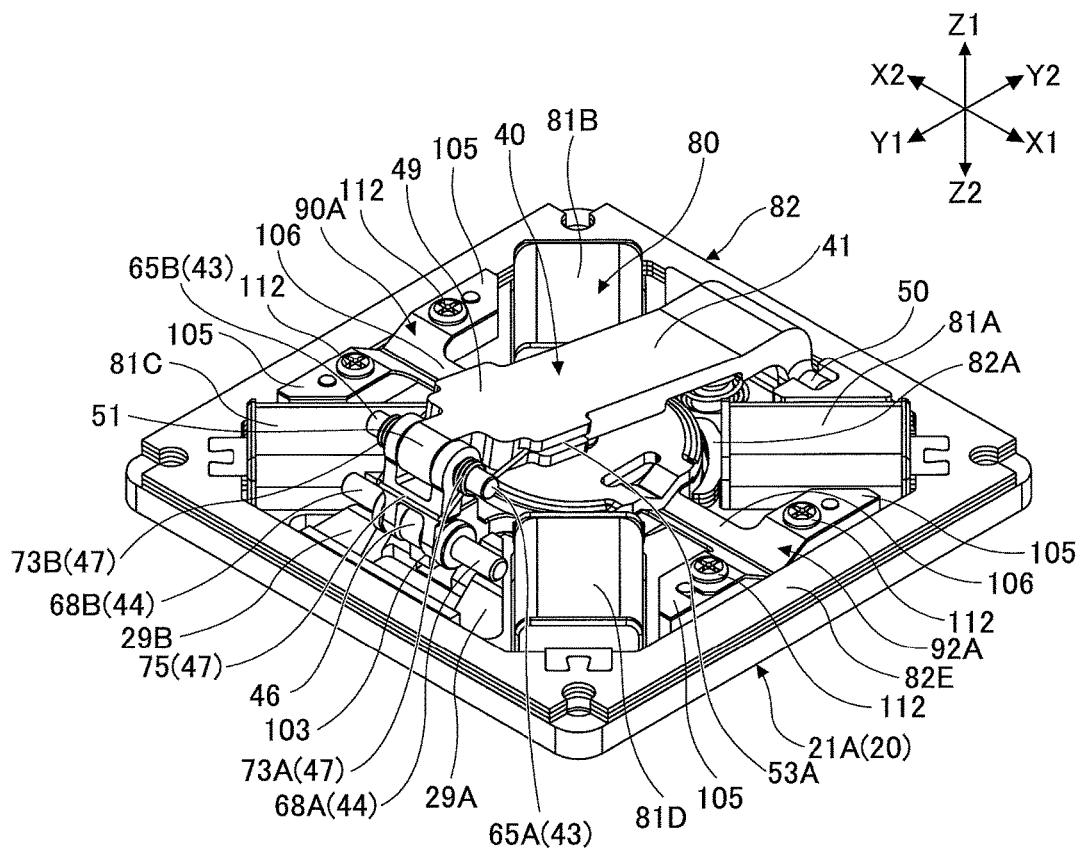
FIG. 4 is a perspective view of the power generator as the first embodiment of the electromagnetic converter in a state where a top cover is detached.

FIG. 4, FIGS. 7A-7D, and FIGS. 8A-8D are diagrams for illustrating power generation operations of the power generator 10. FIG. 4 is a perspective view of the power generator 10 in a state where the switch unit 40, the coil unit 80, and the magnet unit 90A are fixed to the case body 21A. FIGS. 7A-7D are cross-sectional views of the power generator 10, and FIGS. 8A-8D are configuration diagrams of core parts that illustrate states of magnetic coupling between the yoke 91 and the coil core 82.

Figure 7A:
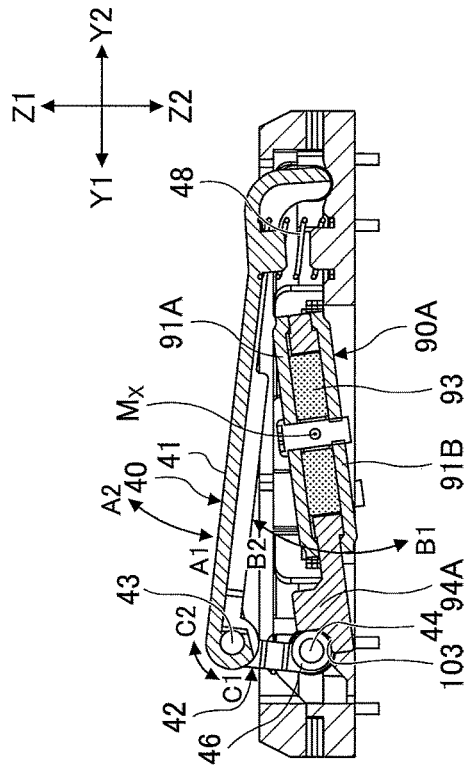
FIGS. 7A-7D are cross-sectional views for illustrating operations of the power generator as the first embodiment.
Figure 8A:
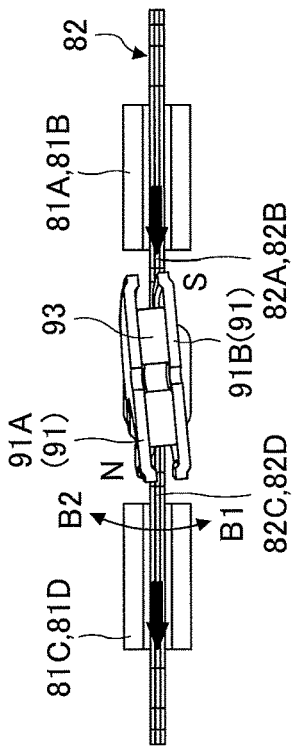
FIGS. 8A-8D are configuration diagrams of core parts for illustrating operations of the magnet unit of the power generator as the first embodiment.

FIG. 4, FIG. 7A, and FIG. 8A illustrate a state where the switch lever 41 is not operated (this state may be referred to as the "pre-operational state", below).

In the pre-operational state, the engagement portions 68A-68B of the switch unit 40 engage with the standing walls 28A-28B, respectively. Also, the roller 46 disposed in the operational member 42 engages with the hook portion 103 of the magnet unit 90A.

However, the roller 46 does not performs a pressing operation on the hook portion 103, and the V-shaped spring portions 106 do not elastically deform. Therefore, the yoke 91 and the magnet 93 disposed in the magnet unit 90A maintain a horizontal state.

In the pre-operational state in which the yoke 91 and the magnet 93 maintain a horizontal state, the coil cores 82A-82D of the coil unit 80 are positioned between the upper yoke 91A and the lower yoke 91B of the magnet unit 90A. Therefore, the upper yoke 91A and the lower yoke 91B, and the coil cores 82A-82D are in a state not magnetically coupled.

Figure 7B:
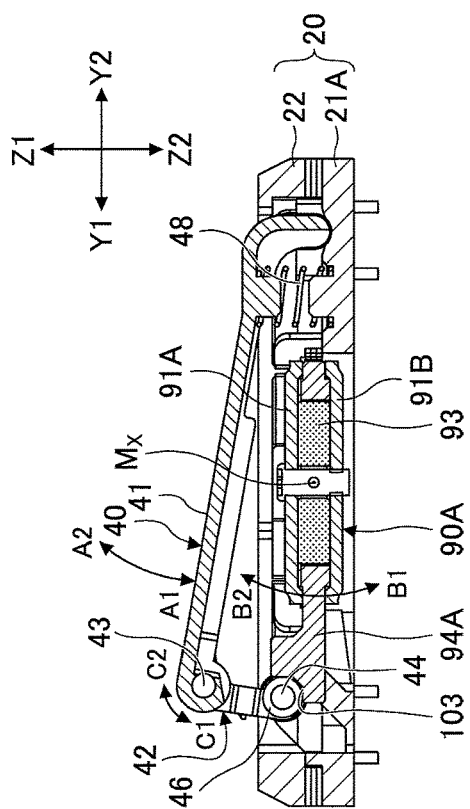
Figure 8B:
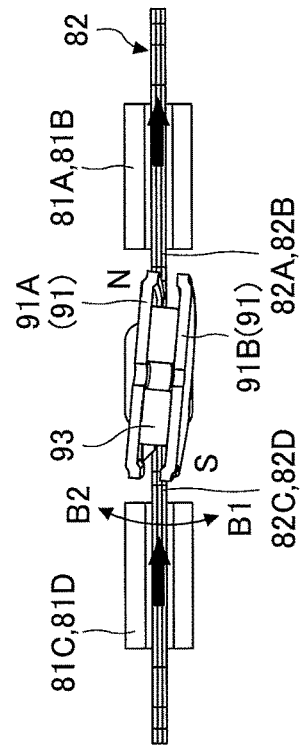

FIG. 7B and FIG. 8B illustrate a state where an operator of the power generator 10 starts a pressing operation on the switch lever 41 (this state may be referred to as the "operation-starting state", below).

When the switch lever 41 receives a pressing operation, the switch lever 41 swings in the direction of the arrow A1 around the shaft portion 50A as the center, and accordingly, the roller 46 disposed in the operational member 42 performs a press operation on the hook portion 103.

By having received the pressing operation on the hook portion 103, a rotational force around the axis in the extending direction of the spring member 92A (the axis MX illustrated in FIG. 5) as the center, is applied to the V-shaped spring portions 106 via the movable member 94A. As described above, the V-shaped spring portions 106 are configured to elastically deform in the rotational direction around the axis MX as the center.

Therefore, by having received the pressing operation on the hook portion 103, the yoke 91 and the magnet 93 rotate in the direction of the arrow B1 around the axis MX as the center. At this moment, as the V-shaped spring portions 106 elastically deform, and hence, the V-shaped spring portions 106 accumulate elastic force.

Also, in a state just after the pressing operation on the switch lever 41 started, the engagement portions 68A-68B of the guide shaft 44 disposed in the operational member 42, engage with the standing walls 28A-28B formed on the case body 21A, respectively.

The standing walls 28A-28B extend in the direction perpendicular to the bottom surface of the case body 21A. Also, the inclined walls 29A-29B have a slope whose width gradually widens in the coming direction (X1 direction). Further, the engagement portion 68A engages with the standing wall 28A and the inclined wall 29A, and the engagement portion 68B engages with the standing wall 28B and the inclined wall 29B.

The standing wall 28A and the inclined wall 29A, and the standing wall 28B and the inclined wall 29B, are configured to be continuously connected with each other, respectively. Therefore, the engagement portion 68A can move freely between the standing wall 28A and the inclined wall 29A, the engagement portion 68B can move freely between the standing wall 28B and the inclined wall 29B.

On the other hand, the operational member 42 is biased in the direction of the arrow C1 by the torsional spring 47. By this elastic force of the torsional spring 47, the engagement portions 68A-68B are pressed against the standing walls 28A-28B and the inclined walls 29A-29B, and securely guided by the standing walls 28A-28B and the inclined walls 29A-29B, to move.

In a state where the engagement portions 68A-68B engage with the standing walls 28A-28B, the operational member 42 extends nearly vertically downwards. Therefore, when the engagement portions 68A-68B moves on the standing walls 28A-28B, the operational member 42 will not rotate in the C1-C2 direction.

Also, in the operation-starting state, since the yoke 91 and the magnet 93 rotate in the direction of the arrow B1 around the axis MX as the center, as illustrated in FIG. 8B, the upper yoke 91A disposed on the side of N magnetic pole of the magnet 93 faces the coil cores 82C-82D of the coils 81C-81D, and the lower yoke 91B disposed on the side of S magnetic pole of the magnet 93 faces the coil cores 82A-82B of the coils 81A-81B.

Therefore, the upper yoke 91A is magnetically coupled with the coil cores 82C-82D, and the lower yoke 91B is magnetically coupled with the coil cores 82A-82B. Thus, the coil unit 80 and the magnet unit 90A form a magnetic path through which a magnetic flux flows in N magnetic pole of the magnet 93; the upper yoke 91A; the coil cores 82C-82D; the frame object 82E; the coils 81A-81B; the lower yoke 91B; and S magnetic pole of the magnet 93, in this order. Note that the direction in which the magnetic flux flows is designated by a thick line arrow in FIGS. 8B-8D.

Figure 7C:
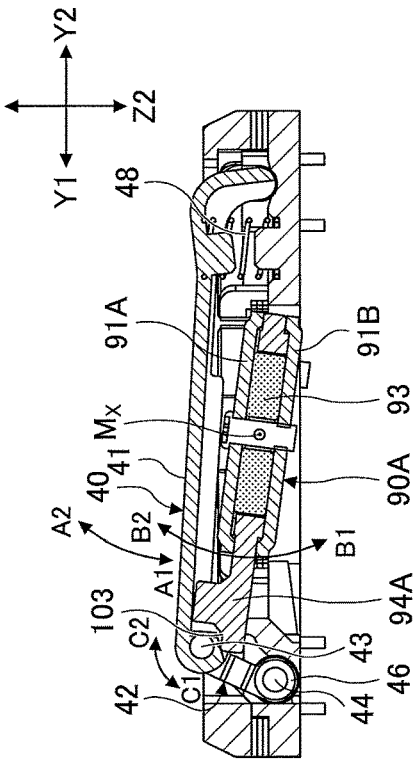
Figure 8C:
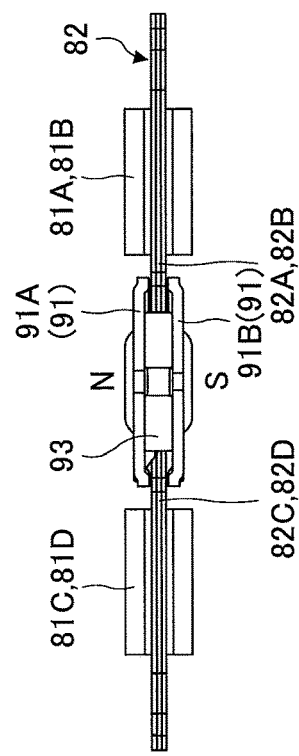

FIG. 7C and FIG. 8C illustrate a state where the pressing operation on the switch lever 41 goes further than in the operation-starting state (this state may be referred to as the "operational state", below).

When the pressing operation on the switch lever 41 goes further than in the operation-starting state, the operational member 42 moves downwards (Z2 direction). When the operational member 42 moves downwards, the engagement portions 68A-68B leave the standing walls 28A-28B, and then, engage with the inclined walls 29A-29B, respectively.

The inclined walls 29A-29B have a slope whose width gradually widens downwards. Therefore, after the engagement portions 68A-68B have engaged with the inclined walls 29A-29B, when the operational member 42 further moves downwards, the engagement portions 68A-68B are guided by the inclined walls 29A-29B, and moved and biased towards the outside (in the X1 direction).

The operational member 42 is borne by the switch lever 41 via the coupling shaft 43 so that the operational member 42 can rotate. Therefore, by having the engagement portions 68A-68B (the guide shaft 44) moved and biased towards the outside (in the X1 direction), the operational member 42 rotates in the direction (the direction of the arrow C2) around the coupling shaft 43 as the center, to be separated from the hook portion 103.

As described above, the operational member 42 has the roller 46 disposed at the lower part, and the roller 46 engages with the V-shaped spring portions 106 in the pre-operational state and the operation-starting state. However, by having the coupling shaft 43 rotates in the C2 direction, the roller 46 also moves in the direction to be separated from the V-shaped spring portions 106. FIG. 7C illustrates a state just before the roller 46 is separated from the hook portion 103.

Also in the operational state, as illustrated in FIG. 8C, the upper yoke 91A is magnetically coupled with the coil cores 82C-82D, and the lower yoke 91B is magnetically coupled with the coil cores 82A-82B. Thus, also in the operational state, the coil unit 80 and the magnet unit 90A form the magnetic path through which a magnetic flux flows in N magnetic pole of the magnet 93; the upper yoke 91A; the coil cores 82C-82D; the frame object 82E; the coils 81A-81B; the lower yoke 91B; and S magnetic pole of the magnet 93, in this order.

Figure 7D:
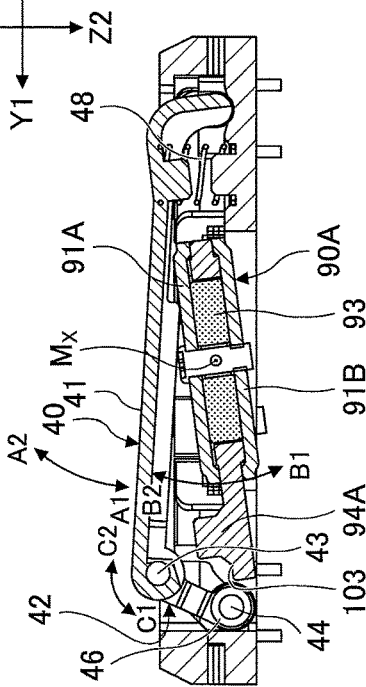
Figure 8D:
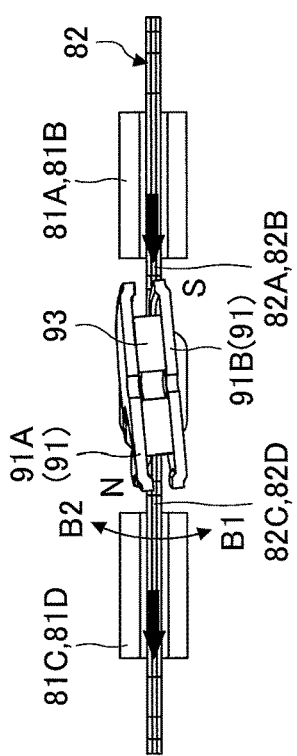

FIG. 7D and FIG. 8D illustrate a state where the pressing operation on the switch lever 41 goes further than in the operational state (this state may be referred to as the "power generating state", below).

When the pressing operation on the switch lever 41 goes further than in the operational state, the operational member 42 rotates further in the C2 direction, and the roller 46 leaves the hook portion 103. By having the roller 46 left the hook portion 103, the yoke 91 and the magnet 93 rotate instantaneously in the B2 direction by the elastic force accumulated in the V-shaped spring portions 106.

By having the yoke 91 and the magnet 93 rotate in the B2 direction, the yoke 91 and the magnet 93 will return to the pre-operational state again. However, the yoke 91 and the magnet 93 will not immediately stop at the position of the pre-operational state, but as illustrated in FIG. 7D, rotate up to a position passing the position of the pre-operational state due to inertial force (this state may be referred to as the "excessively moved state", below).

In this excessively moved state, as illustrated in FIG. 8D, since the yoke 91 and the magnet 93 rotate in the direction of the arrow B2 around the axis MX as the center, as illustrated in FIG. 8B, the upper yoke 91A disposed on the side of N magnetic pole of the magnet 93 faces the coil cores 82A-82B of the coils 81A-81B, and the lower yoke 91B disposed on the side of S magnetic pole of the magnet 93 faces the coil cores 82C-82D of the coils 81C-81D.

Therefore, the upper yoke 91A is magnetically coupled with the coil cores 82A-82B, and the lower yoke 91B is magnetically coupled with the coil cores 82C-82D. Thus, the coil unit 80 and the magnet unit 90A form a magnetic path through which a magnetic flux flows in N magnetic pole of the magnet 93; the upper yoke 91A; the coil cores 82A-82B; the frame object 82E; the coils 81C-81D; the lower yoke 91B; and S magnetic pole of the magnet 93, in this order.

The flowing direction of the magnetic flux in the excessively moved state illustrated in FIG. 8D is reverse to the flowing direction of the magnetic flux in the operational state illustrated in FIG. 8C.

This reversal of the magnetic flux is generated due to instantaneous movement of the yoke 91 and the magnet 93 from the position in the operational state to the position in the excessively moved state, by the elastic force accumulated in the V-shaped spring portions 106 when the roller 46 has left the hook portion 103. Therefore, a great magnetic flux change is instantaneously generated in the coil core 82, and a great induced electromotive force is generated in the coils 81A-81D mounted with the coil cores 82A-82D (power is generated).

Here, "instantaneous movement of the yoke 91 and the magnet 93" means movement of the yoke 91 and the magnet 93 at a speed with which an induced electromotive force is generated in the coils 81A-81D.

Once having moved up to the position of the excessively moved state as described above, the yoke 91 repeats vibrations by the elastic force of the V-shaped spring portions 106, and eventually, returns to the pre-operational state (the horizontal state).

Note that in the power generator 10 according to the embodiment, the yoke 91, the magnet 93, and the movable member 94A that can move while generating power (these may be collectively referred to as the "movable objects", below), vibrate at a resonance frequency Fr calculated by the following formula (1) where J represent the moment of inertia of the movable objects, and KSP represents the spring constant of the V-shaped spring portions 106 in the torsional direction around the axis MX as the center.

$$Fr = \frac{1}{2\pi}\sqrt{\frac{K_{sp}}{J}} \quad (1)$$

Also, the power generator 10 according to the embodiment is driven based on an equation of motion represented by the following formula (2), and a circuit equation represented by the following formula (3).

$$J\frac{d^2\theta(t)}{dt^2} = K_t i(t) - K_{sp}(\theta(t) + \theta_0) - D\frac{d\theta(t)}{dt} \quad (2)$$

J: moment of inertia [kgm²]
θ(t): angle [rad]
θ₀: initial angle [rad]
$K_t$: torque constant [Nm/A]
i(t): current [A]
$K_{sp}$: spring constant [Nm/rad]
D: attenuation constant [Nm/(rad/s)]

$$-K_e\frac{d\theta(t)}{dt} = Ri(t) + L\frac{di(t)}{dt} \quad (3)$$

$K_e$: counter electromotive force constant [V/(rad/s)]
R: resistance [Ω]
L: inductance [H].

In other words, the moment of inertia, angle, initial angle, torque constant, current, spring constant, damping coefficient, and the like in the power generator 10 can be changed appropriately as long as the formula (2) is satisfied, and the counter electromotive force constant, resistance, and inductance can be changed appropriately as long as the formula (3) is satisfied.

The power generator 10 according to the embodiment described above supports the yoke 91, the magnet 93, and the movable member 94A (the movable objects) by the spring member 92A having the V-shaped spring portions 106. As described above, the V-shaped spring portion 106 whose cross section has a V-shape has high rigidities in the rotational direction centered around the axis MZ, and in the rotational direction centered around the axis MY, but has a lower rigidity in the rotational direction centered around the axis MX, compared to the rigidities around the other axes.

Therefore, by using the spring member 92A, it is possible to have the yoke 91 and the magnet 93 rotate only around the axis extending in the extending direction of the spring member 92A (around the axis MX). Thus, it is possible to prevent unnecessary movement (rotation around the axis MY or the axis MZ as the center) of the yoke 91 and the magnet 93, and to make the power generation efficiency higher.

Also, the spring member 92A has the base portions 105 at both end portions, and these base portions 105 are fixed to the case body 21A by using the fixing screws 112. By having the spring member 92A fixed at both ends in this way, it is possible to increase precision of the rotational center when the yoke 91 and the magnet 93 perform rotational movement.

Also, by adopting the structure in which both end portions of the spring member 92A are fixed, compared to a structure in which only one side is fixed, even if a weak spring is used as the V-shaped spring portion 106, it is possible to support the movable objects including the yoke 91, the magnet 93, and the movable member 94A, and to make the spring rigidity higher, and hence, the spring member 92A (the V-shaped spring portion 106) can be downsized.

Further, by using the spring member 92A, a shaft supporting mechanism, which may be constituted with a shaft and shaft bearings, is not required for supporting the movable objects including the yoke 91, the magnet 93, and the movable member 94A. Therefore, compared to a case that uses a shaft supporting mechanism, the number of parts and the cost can be reduced, and the assemblability can be improved. Also, since the spring member 92A has no shaft sliding portion, no friction is generated, which makes the reliability higher, and generation of noise can be prevented.

Next, by using FIG. 9 to FIG. 11, a modified example of the power generator 10 described above will be described.

Figure 9:
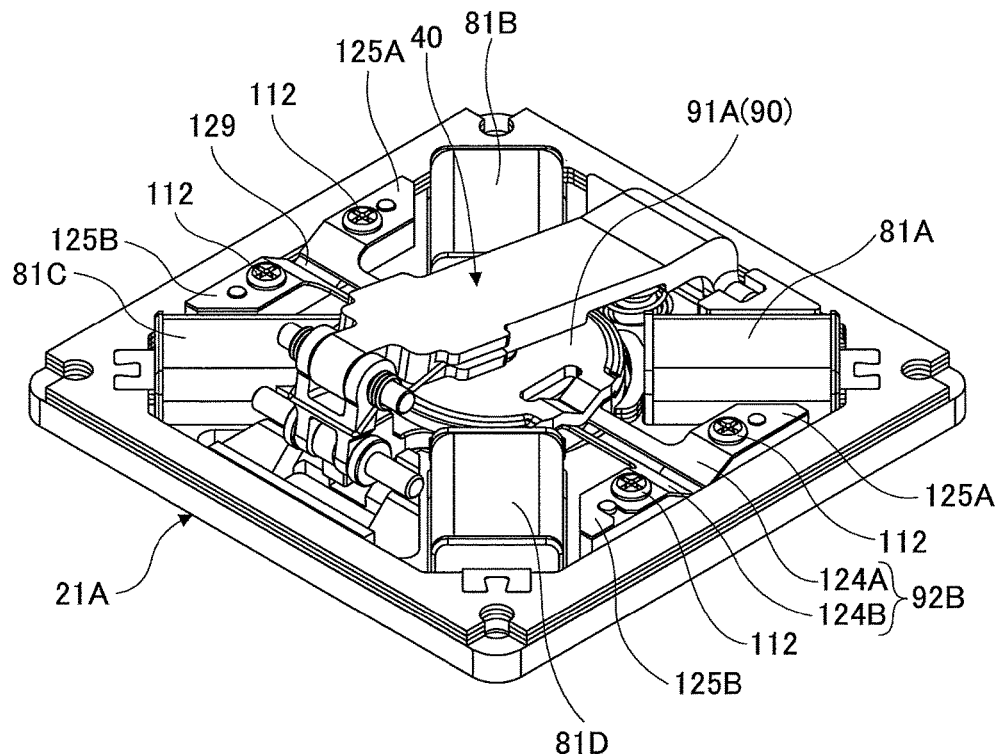
FIG. 9 is a perspective view of a power generator as a modified example of the first embodiment in a state where a top cover is detached.

FIG. 9 is a perspective view of a power generator according to the modified example in a state where a top cover 22 is detached; FIG. 10 is an enlarged perspective view of a magnet unit 90B of the power generator according to the modified example; and FIG. 11 is an enlarged plan view of a spring member 92B disposed in the magnet unit 90B. Note that the same numerical codes are assigned to elements in FIG. 9 to FIG. 11 as in FIG. 1 to FIG. 8 for the corresponding elements of the power generator 10, and their description is omitted.

In the power generator 10 illustrated in FIG. 1 to FIG. 8D, the magnet unit 90A is formed of a metal plate having a spring property, by press molding, to be integrated. In contrast to this, the modified example is characterized by the spring member 92B that is constituted with two members, or a half spring portion 124A and a half spring portion 124B.

The half spring portions 124A-124B have respective shapes that are obtained by cutting the spring member 92A described above at the lower end of the V-shaped portion (the vertex of the angle) of the V-shaped spring portions 106 in the longitudinal direction.

The half spring portions 124A-124B include base portions 125A-125B, V-shaped portions 126A-126B, and holder portions 127A-127B.

The base portions 125A-125B have through-holes 128A-128B formed. As illustrated in FIG. 9, these base portions 125A-125B are fixed to the case body 21A, by having the fixing screws 112 inserted through the through-holes 128A-128B, and screwed into the screw holes 32 (see FIG. 3). Therefore, the structure is obtained in which both ends of the base portions 125A-125B are fixed to the case body 21A.

The V-shaped portions 126A-126B are formed between the base portions 125A-125B and the holder portions 127A-127B. The base portions 125A-125B and the holder portions 127A-127B extend in nearly parallel with the bottom surface of the case body 21A, whereas the V-shaped portions 126A-126B are tilted with respect to the bottom surface of the case body 21A.

Figure 10:
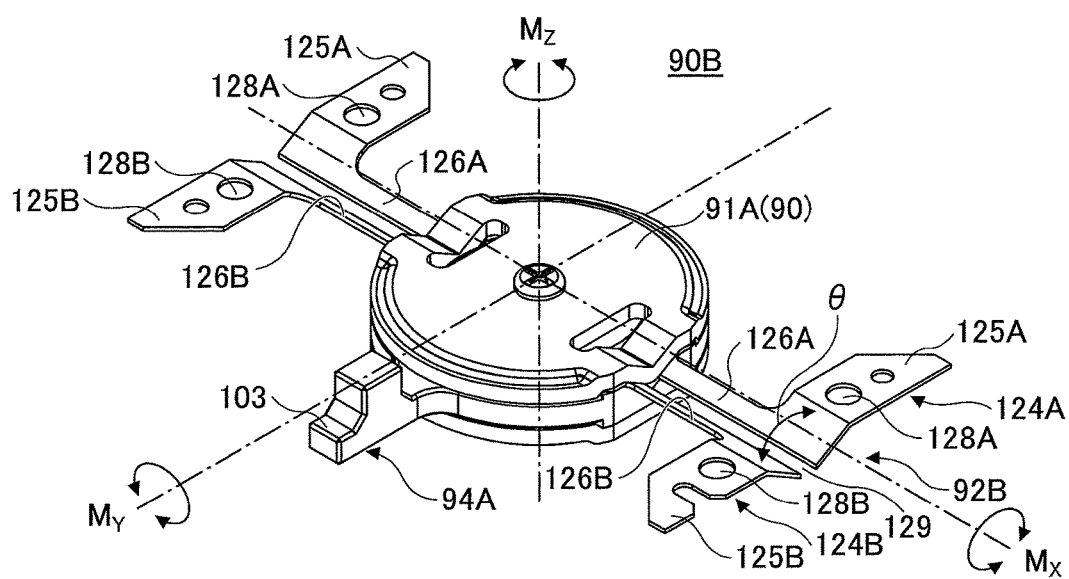
FIG. 10 is a perspective view of a magnet unit of the power generator as the modified example of the first embodiment.
Figure 11:
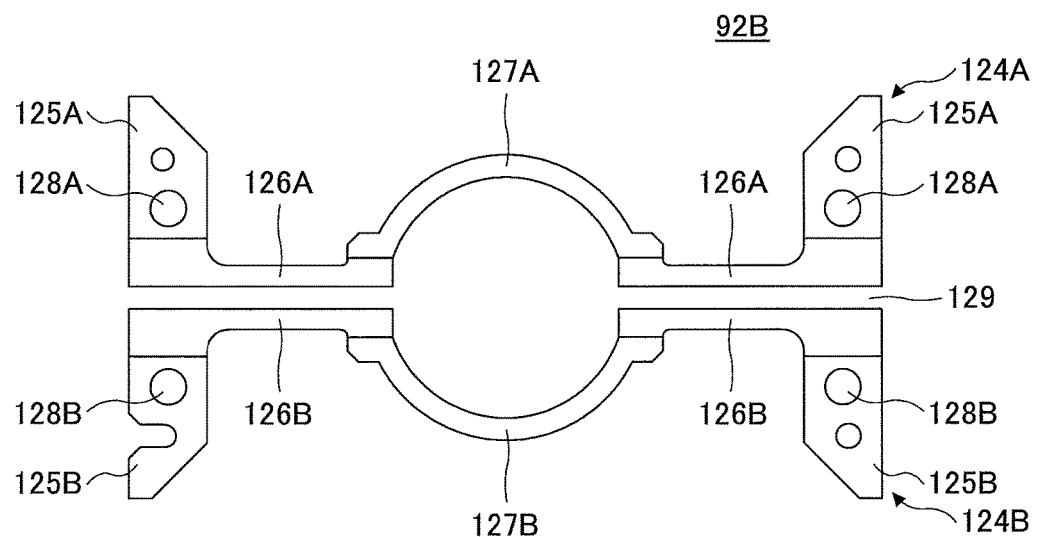
FIG. 11 is a plan view of a spring member disposed in the magnet unit of the power generator as the modified example of the first embodiment.

Also, in a state where the half spring portions 124A-124B are fixed to the case body 21A, the V-shaped portion 126A and the V-shaped portion 126B have a V-shape in side view (viewed in the X1 direction or the X2 direction in FIG. 10). However, since the half spring portion 124A and the half spring portion 124B are separate members, a slit portion 129 is formed at the vertex of the V shape. Note that it is desirable that the angle of V-shaped part of the V-shaped portion 126A and the V-shaped portion 126B (the angle designated by arrow θ in FIG. 10) is greater than or equal to 90° and less than or equal to 120°.

The holder portions 127A-127B exhibit a ring shaped in a state where the half spring portions 124A-124B are fixed to the case body 21A. These holder portions 127A-127B have the yoke 91, the magnet 93, and the movable member 94A attached.

Although the magnet unit 90B used in the modified example has the half spring portion 124A and the half spring portion 124B as separate elements, the V-shaped portions 126A-126B are configured to be tilted with respect to the extending direction of the base portions 125A-125B (the bottom surface of the case body 21), and exhibit a V-shape in a state where the spring member 92B is fixed to the case body 21A.

Therefore, it possible for the magnet unit 90B to move the yoke 91 and the magnet 93 only in the rotational direction around the axis MX as the center. Therefore, also in the modified example, it is possible to prevent unnecessary movement of the yoke 91 and the magnet 93, and to make the power generation efficiency higher when generating power.

Also, as in the modified example, by having the spring member 92B that is constituted with two members of the half spring portion 124A and the half spring portion 124B, it is not affected by processing precision (angle) of the V-shaped part of the V-shaped spring portions 106 as in the spring member 92A, manufacturability of the half spring portions 124A-124B can be raised.

Next, a power generator 200 will be described as a second embodiment 200 of the present invention.

Figure 12:
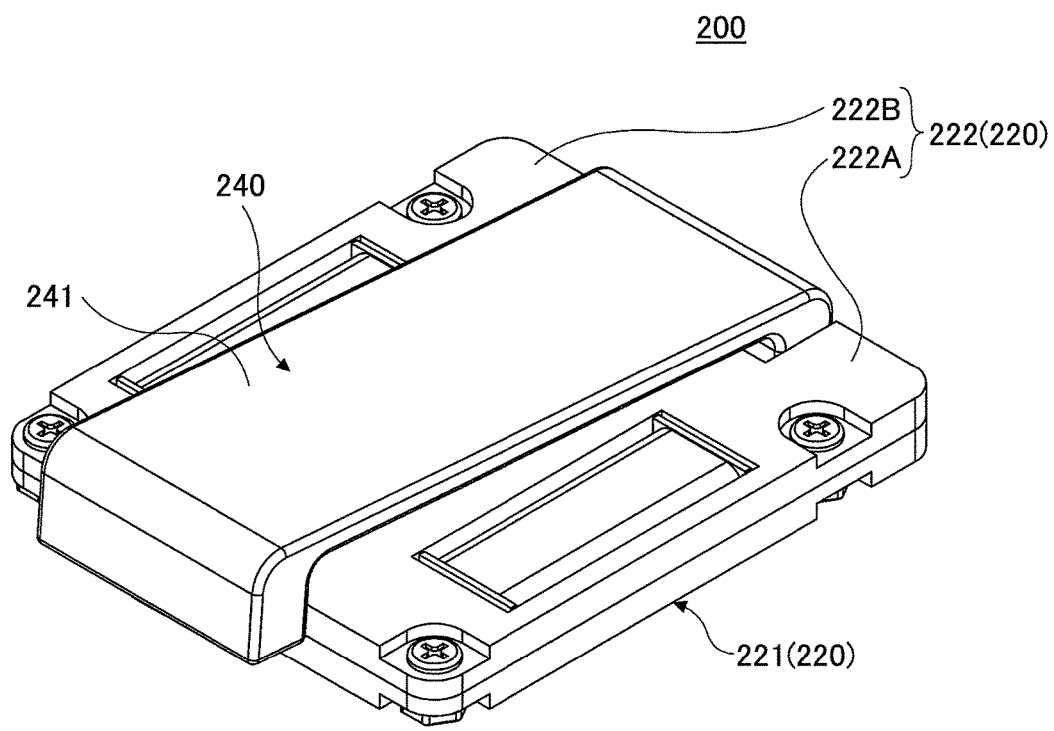
FIG. 12 is a perspective view of a power generator as a second embodiment of an electromagnetic converter.
Figure 13:
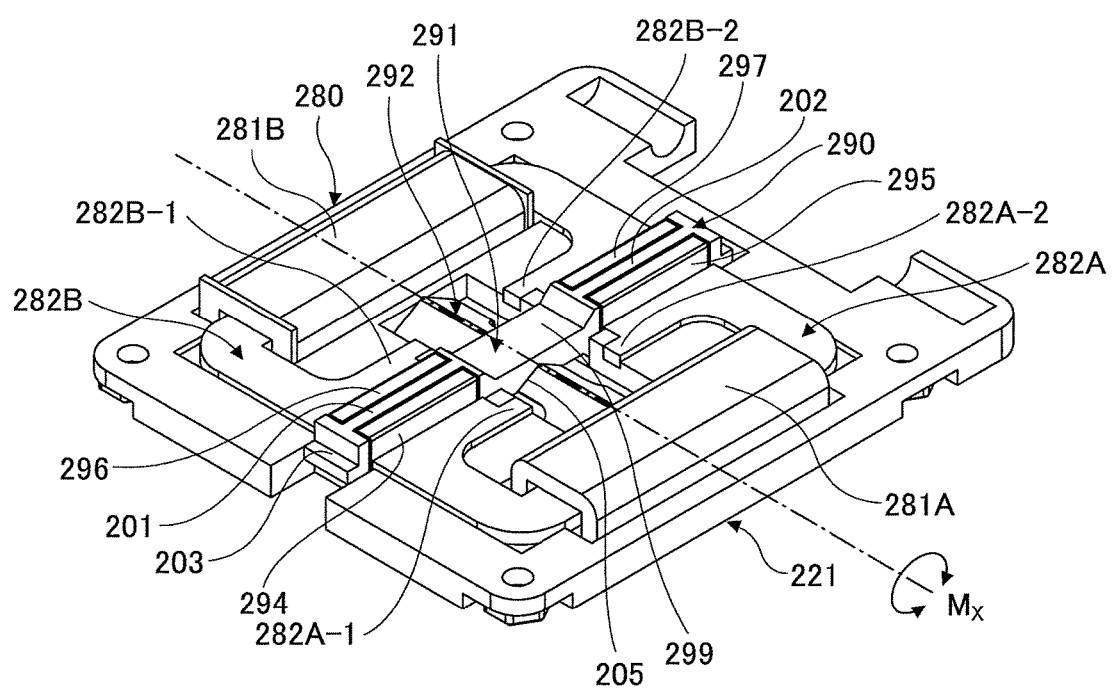
FIG. 13 is a perspective view of the power generator as the second embodiment of the electromagnetic converter in a state where a top cover is detached.

FIG. 12 and FIG. 13 are diagrams for illustrating the power generator 200 as the second embodiment. FIG. 12 is a perspective view of the power generator 200, and FIG. 13 is a perspective view of the power generator 200 in a state where a top cover 222 is detached.

Similar to the power generator 10 according to the first embodiment described above, the power generator 200 includes a case 220, a switch unit 240, a coil unit 280, and a magnet unit 290. This power generator 200 is also configured to generate power by displacing the magnet unit 290 with respect to the coil unit 280 when receiving an operation on a switch lever 241 of the switch unit 240, and by changing the magnetic flux penetrating the coil.

The case 220 includes a case body 221 and the top cover 222. Also, the top cover 222 is constituted with half top covers 222A and 222B. A space portion is formed between the half top cover 222A and the half top cover 222B, and the switch 241 of the switch unit 240 is disposed in this space portion (see FIG. 1).

Similar to the switch unit 40 in the first embodiment, the switch unit 240 includes a switch 241, an operational member, a roller, a torsional spring, a coupling shaft, and a guide shaft (not illustrated in the figure except for the switch 241).

When the switch lever 241 receives a pressing operation, the roller disposed in the operational member performs a press operation on the hook portion 203 of the magnet unit 290. Then, similar to the switch unit 40 in the first embodiment, when the switch 241 is pressed down to a predetermined position, the operational member rotates to have the roller leave the hook portion 203.

As illustrated in FIG. 13, the coil unit 280 includes coils 281A-281B, coil cores 282A-282B, and the magnet unit 290.

The coils 281A-281B are configured to be formed of copper wire coated with an insulating material that is wound many times around respective holders made of resin. Also, the coil cores 282A-282B are formed of magnetic metal plates, and has an oval shape having a cut in plan view (nearly an Ω shape).

The coils 281A-281B and the coil cores 282A-282B are mounted on the case body 21. In the mounted state, the coil cores 282A-282B and the coil cores 282A-282B face the magnet unit 290, which will be described later. Thus, the coil cores 282A-282B and the coil cores 282A-282B are configured to be disposed having the magnet unit 290 interposed.

Note that in the following description, parts in the coil core 282A that face the magnet unit 290 (magnet mount portion 201) may be referred to as facing portions 282A-1 and 282A-2. Also, parts in the coil core 282B of the coil unit 280B that face the magnet unit 290 (magnet mount portion 202) may be referred to as facing portions 282B-1 and 282B-2.

Next, the magnet unit 290 will be described.

As illustrated in FIG. 13, the magnet unit 290 includes a yoke 291, a spring member 292, and magnetic pairs 294-297.

The magnet unit 290 is disposed at nearly the center position of the case body 21. Also, the magnet unit 290 is disposed under the switch unit 40.

The yoke 291 is a member formed of a magnetic metal, and has a nearly square pillar shape. This yoke 291 has a spring fixing portion 299 formed at the center. Also, the spring fixing portion 299 has magnet mount portions 201-202 formed on both sides. Further, the spring fixing portion 299 has a V-shaped concave portion 205 formed that has a shape corresponding to the shape of the spring member 292.

The magnet mount portions 201-202 are formed to extend towards the both sides from the spring fixing portion 299. These magnet mount portions 201-202 have the magnetic pairs 294-297 fixed.

Also, the magnet mount portion 201 has the hook portion 203 formed one the closer side in the figure. This hook portion 203 engages with the roller (not illustrated in the figure) of the switch unit 240.

The spring member 292 is formed of a spring plate material by press molding to be integrated. Similar to the V-shaped spring portions 106 in the first embodiment, the spring member 292 has a V shape. In the embodiment, the spring member 292 is placed to have the vertex of the V-shape positioned upwards.

Both end portions of the spring member 292 are fixed to the case body 221 by fixing screws (not illustrated). Also, the spring fixing portion 299 of the yoke 291 described above is fixed to the spring member 292 at the center position. In a state where the yoke 291 is fixed to the spring member 292, the longitudinal direction of the yoke 291 is perpendicular to the extending direction of the V-shaped spring portion 106.

In this way, the yoke 291 is supported by the spring member 292 having the V-shape in the embodiment. The rigidity of the spring member 292 in the rotational direction centered around the axis MX in FIG. 13 is lower than the rigidities around the other axes. Therefore, the yoke 291 only moves in the direction around the axis MX as the center. Therefore, also in the embodiment, it is possible to prevent unnecessary movement of the yoke 291 and the magnetic pairs 294-297.

The magnetic pairs 294-297 are constituted with pairs of magnets MGN and magnets MGS having opposite polarities to each other. The magnetic pairs 294-297 have the magnets MGN disposed upwards, and have the magnets MGS disposed downwards.

The magnetic pair 294 and the magnetic pair 296 are fixed to the magnet mount portion 201, and the magnetic pair 295 and the magnetic pair 297 are fixed to the magnet mount portion 202. Also, the magnetic pair 294 and the magnetic pair 296 are placed back to back having the magnet mount portion 201 interposed at the center, the magnetic pair 295 and the magnetic pair 297 are placed back to back having the magnet mount portion 202 interposed at the center.

Next, operations of the power generator 200 will be described according to the embodiment.

Figure 14A:
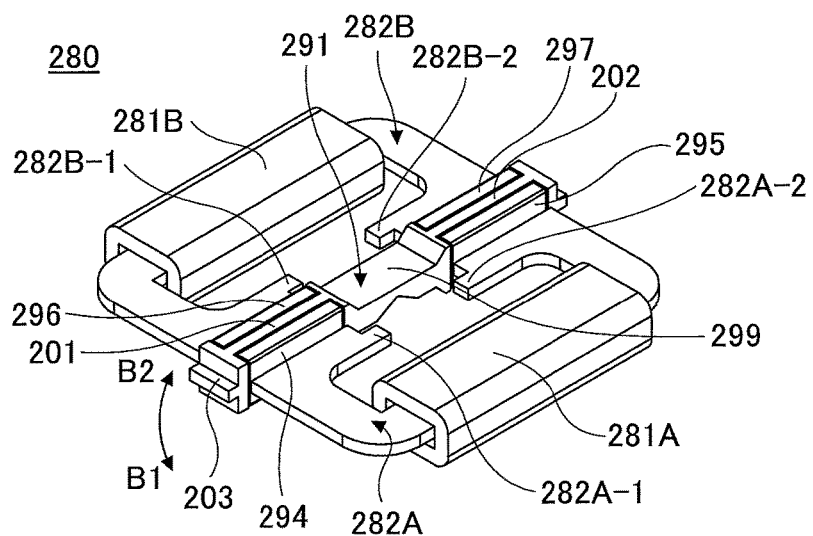
FIGS. 14A-14C are perspective views for illustrating operations of a coil unit of the power generator as the second embodiment.
Figure 14B:
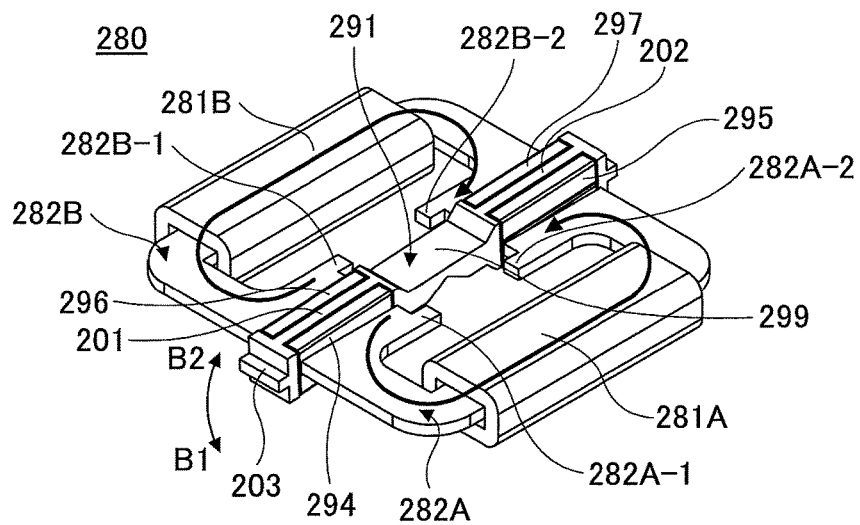
Figure 14C:
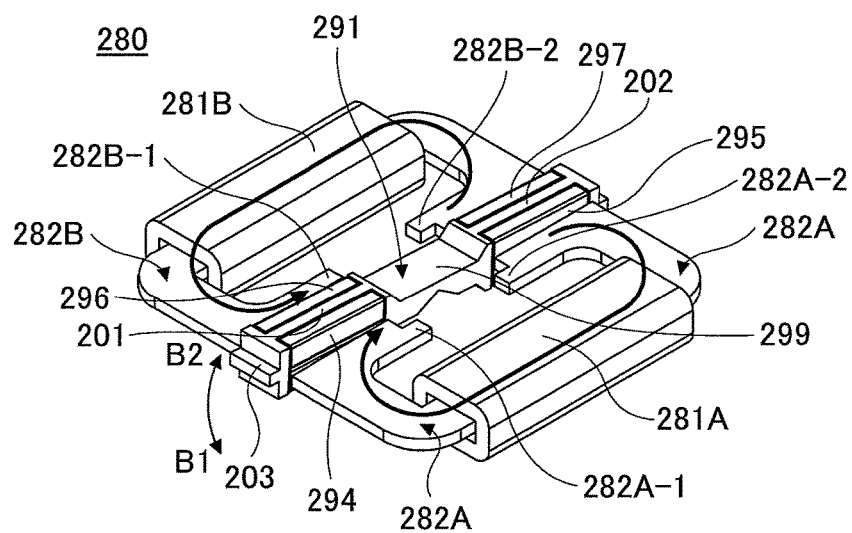
Figure 15A:
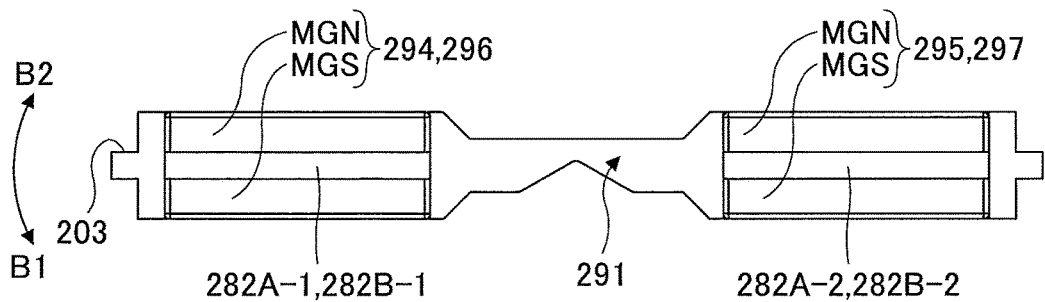
FIGS. 15A-15C are configuration diagrams of core parts for illustrating operations of the magnet unit of the power generator as the second embodiment.
Figure 15B:
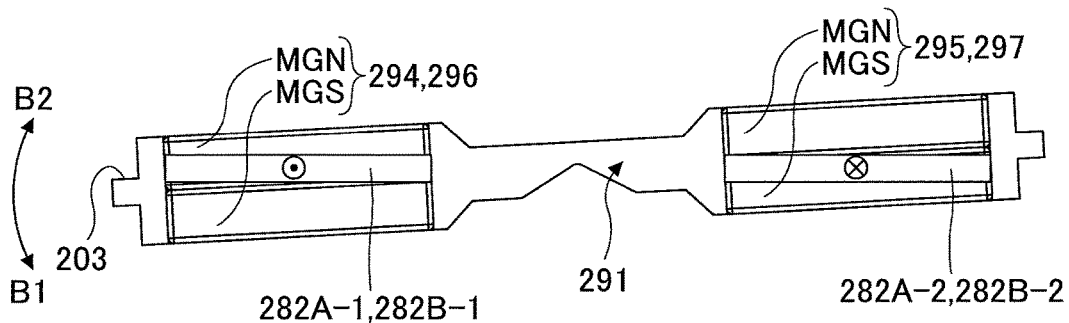
Figure 15C:
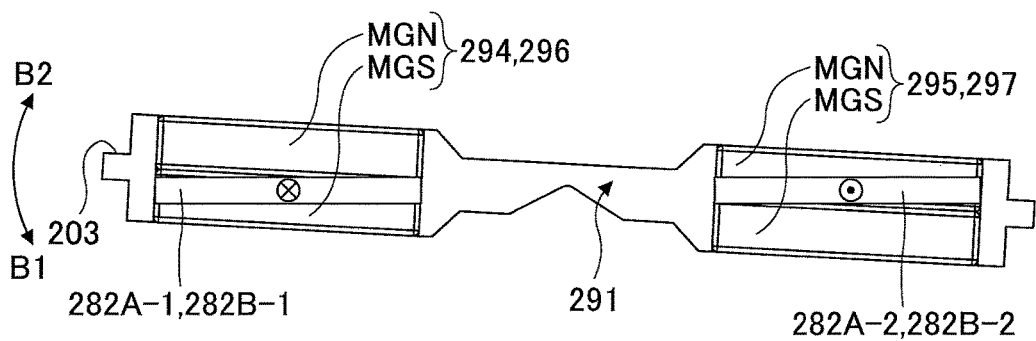

FIGS. 14A-14C and FIGS. 15A-15C are diagrams for illustrating operations of the power generator 200. FIG. 14A to FIG. 14C are cross-sectional views of the coil unit 280, enlarged for the sake of illustration and description. Also, FIG. 15A to FIG. 15C are schematic configuration diagrams illustrating positional relationships between the coil cores 282A-282B and the magnets MGN and MGS.

Note that the facing portion 282A-1 and the facing portion 282B-1, and the facing portion 282A-2 and the facing portion 282B-2 are actually disposed on both side surfaces of the magnet unit 90A. However, the height of the facing portions 282A-1 and 282B-1 with respect to the case body 221 is always constant, and also the height of the facing portions 282A-2 and 282B-2 with respect to the case body 221 is always constant. Therefore, in FIG. 15, the facing portion 282A-1 and the facing portion 282B-1, and the facing portion 282A-2 and the facing portion 282B-2 are overlapped in the illustration. Further, the magnetic pair 294 and the magnetic pair 296, and the magnetic pair 295 and the magnetic pair 297 are overlapped in the illustration for the same reason.

FIG. 14A and FIG. 15A illustrate the pre-operational state of the coil unit 280 (a state where a pressing operation is not performed on the switch lever 41). In the pre-operational state, the yoke 91 is in a horizontal state, and the spring member 292 is in a state where elastic force is not accumulated.

Also, the facing portions 282A-1 and 282B-1 of the coil cores 282A-282B are configured to face boundary positions between the magnets MGN and the magnets MGS of the magnetic pairs 294 and 296 in the pre-operational state. Similarly, the facing portions 282A-2 and 282B-2 of the coil cores 282A-282B are configured to face boundary positions between the magnets MGN and the magnets MGS of the magnetic pairs 295 and 297.

Note that the magnets MGN have the positive polarity (N magnetic pole) on the side that faces the facing portions 282A-1, 282A-2, 282B-1, and 282B-2, respectively. Also, the magnets MGS have the negative polarity (S magnetic pole) on the side that faces the facing portions 282A-1, 282A-2, 282B-1, and 282B-2, respectively.

FIG. 14B and FIG. 15B illustrate the coil unit 280 in the operational state where a pressing operation is performed on the switch lever 41. In the operational state, the switch 241 having received the pressing operation makes the switch unit 240 press the hook portion 103. This makes the yoke 291 move in the direction of the arrow B1 against the elastic force of the spring member 292.

By having the yoke 291 rotate in the direction of B1, the magnetic pairs 294, 296, 295, and 297 fixed to the yoke 291 also move. Also, by having the yoke 291 rotate in the direction of B1, the spring member 292 having the V-shape elastically deforms, and hence, elastic force is accumulated in the spring member 292.

In this the operational state, as illustrated in FIG. 15B, the magnets MGN of the magnetic pairs 294 and 296 face the facing portions 282A-1 and 282B-1, respectively. Also, the magnets MGS of the magnetic pairs 295 and 297 face the facing portions 282A-2 and 282B-2, respectively.

The magnets MGN magnetically coupled with the facing portions 282A-1 and 282B-1, and the magnets MGS magnetically coupled with the facing portions 282A-2 and 282B-2 have the respective magnetic poles opposite to each other. Therefore, magnetic flux is generated in each of the coil cores 282A-282B that flows from the facing portions 282A-1 and 282B-1 to the facing portions 282A-2 and 282B-2 (respective flows of the magnetic flux are designated by bold arrows in FIG. 14B).

When the pressing operation on the switch lever 41 goes further than in the operational state, the roller disposed in the operational member leaves the hook portion 203. Thus, the pressing on the yoke 291 by the switch unit 40 is released, and the yoke 291 instantaneously rotates in the direction of the arrow C2 by the elastic force accumulated in the spring member 292, to transition to the excessively moved state. FIG. 14C and FIG. 15C illustrate the coil unit 280 in the excessively moved state.

In this the excessively moved state, the magnets MGS of the magnetic pairs 294 and 296 face the facing portions 282A-1 and 282B-1, respectively. Also, the magnets MGN of the magnetic pairs 295 and 297 face the facing portions 282A-2 and 282B-2, respectively.

The magnets MGS magnetically coupled with the facing portions 282A-1 and 282B-1, and the magnets MGN magnetically coupled with the facing portions 282A-2 and 282B-2 have the respective magnetic poles opposite to each other. Therefore, magnetic flux is generated in each of the coil cores 282A-282B that flows from the facing portions 282A-2 and 282B-2 to the facing portions 282A-1 and 282B-1 (respective flows of the magnetic flux are designated by bold arrows in FIG. 14C).

In this way, the power generator 200 according to the embodiment is configured so that the direction of the magnetic flux that flows in the coil cores 282A-282B in the operational state, is opposite to the direction of the magnetic flux that flows in the coil cores 282A-2825 in the excessively moved state. Also, when the power generator 200 transitions from the operational state to the excessively moved state, the yoke 291 instantaneously moves in the C2 direction from the position in the operational state to the position in the excessively moved state, by the elastic force of the spring member 292.

Thus, the magnetic flux flowing in the coil cores 282A-282B reverses the direction instantaneously. Therefore, a great magnetic flux change is instantaneously generated in the coil cores 282A-282B, and a great induced electromotive force is generated in the coil 81A (81B) mounted on the coil cores 282A-282B.

Since the power generator 200 in the embodiment also has the spring member 292 formed in the V-shape, it is possible to prevent unnecessary movement of the yoke 291 and the magnetic pairs 294-297, and to make the power generation efficiency higher when generating power. Also, by having the spring member 292 fixed to the case body 221 at both ends, it is possible to increase precision of the rotational center when the yoke 91 and the magnetic pairs 294-297 perform rotational movement.

Also, in the embodiment, by having the magnetic pair 294 and the magnetic pair 296, and the magnetic pair 295 and the magnetic pair 297 disposed having the yoke 291 (the magnet mount portions 201-202) interposed, magnetic circuits having the same configuration are placed on the front and back of the magnetic pair 297, respectively, and hence, the amount of power generation can be doubled.

Note that although an example has been described in the embodiment in which the directions of the magnetic poles of the magnetic pair 294 and the magnetic pair 296 is the same as the direction of the magnetic poles of the magnetic pair 295 and the magnetic pair 297, it is possible to have the directions opposite to each other. If such a configuration is adopted, it is possible to prevent the magnetic flux from being canceled between the magnetic pair 294 and the magnetic pair 296, and between the magnetic pair 295 and the magnetic pair 297.

Also, although an example has been described in the embodiment in which the total number of the magnets MGN and MGS is eight, the number of the magnets to be disposed is not specifically limited, for example, the magnets placed on the upper side of the yoke 291 may be integrated.

Further, a magnet MGN and a magnet MGS, or two mages in total, are placed above and below the yoke 291 in the embodiment. However, by using a two-pole magnetized magnet, two magnets placed in the embodiment may be replaced with the single integrated magnet.

Next, the pump as a third embodiment 300 of the present invention will be described.

In the embodiment, an electromagnetic converter according to the present invention is used as an actuator 400, which is used as a drive source of a pump 300.

Figure 16:
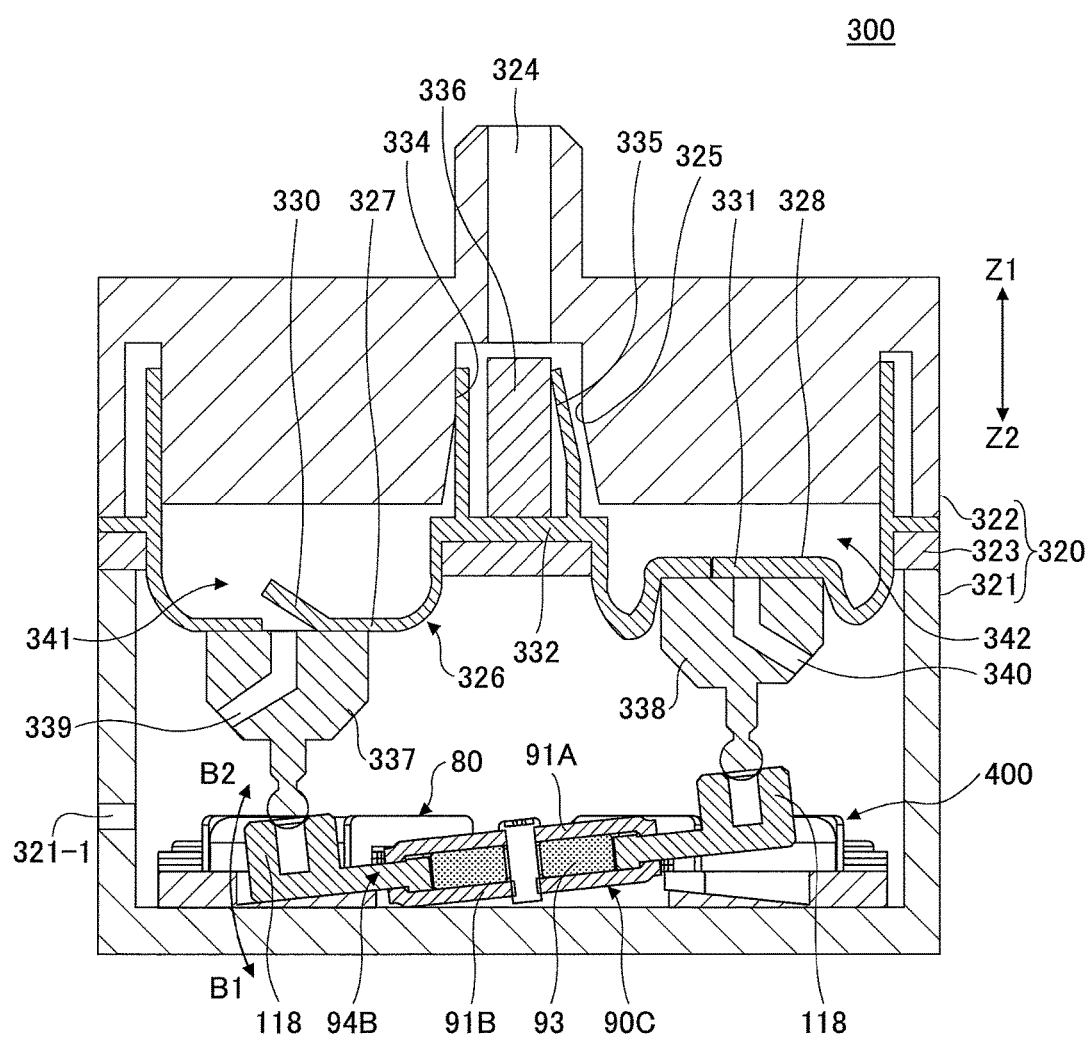
FIG. 16 is a cross-sectional view of a pump as a third embodiment of an electromagnetic converter.
Figure 17:
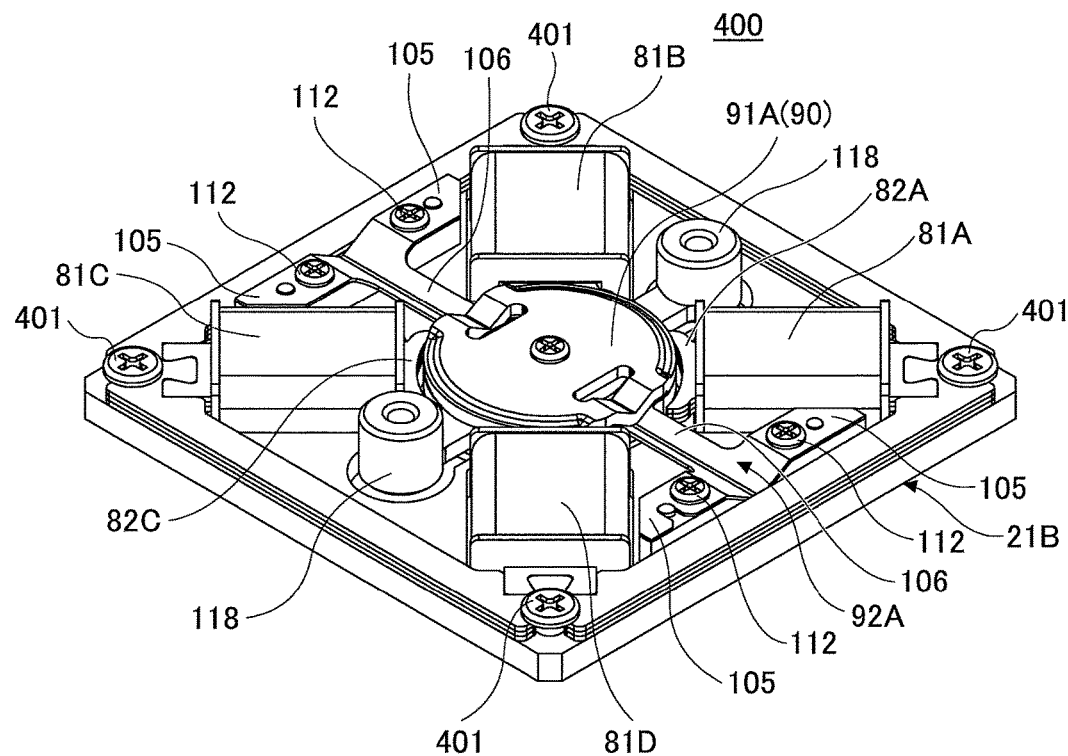
FIG. 17 is a perspective view of an actuator disposed in the pump as the third embodiment.
Figure 18:
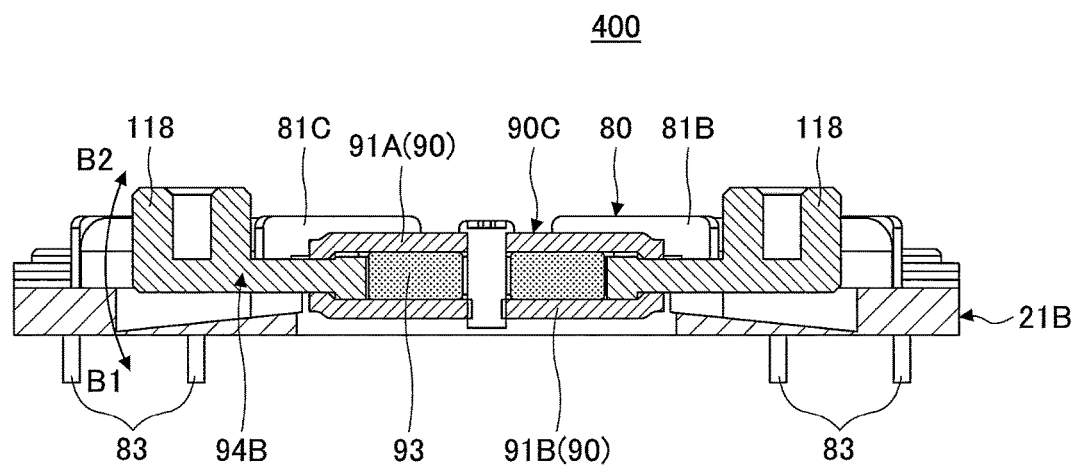
FIG. 18 is a cross-sectional view of the actuator disposed in the pump as the third embodiment.
Figure 19:
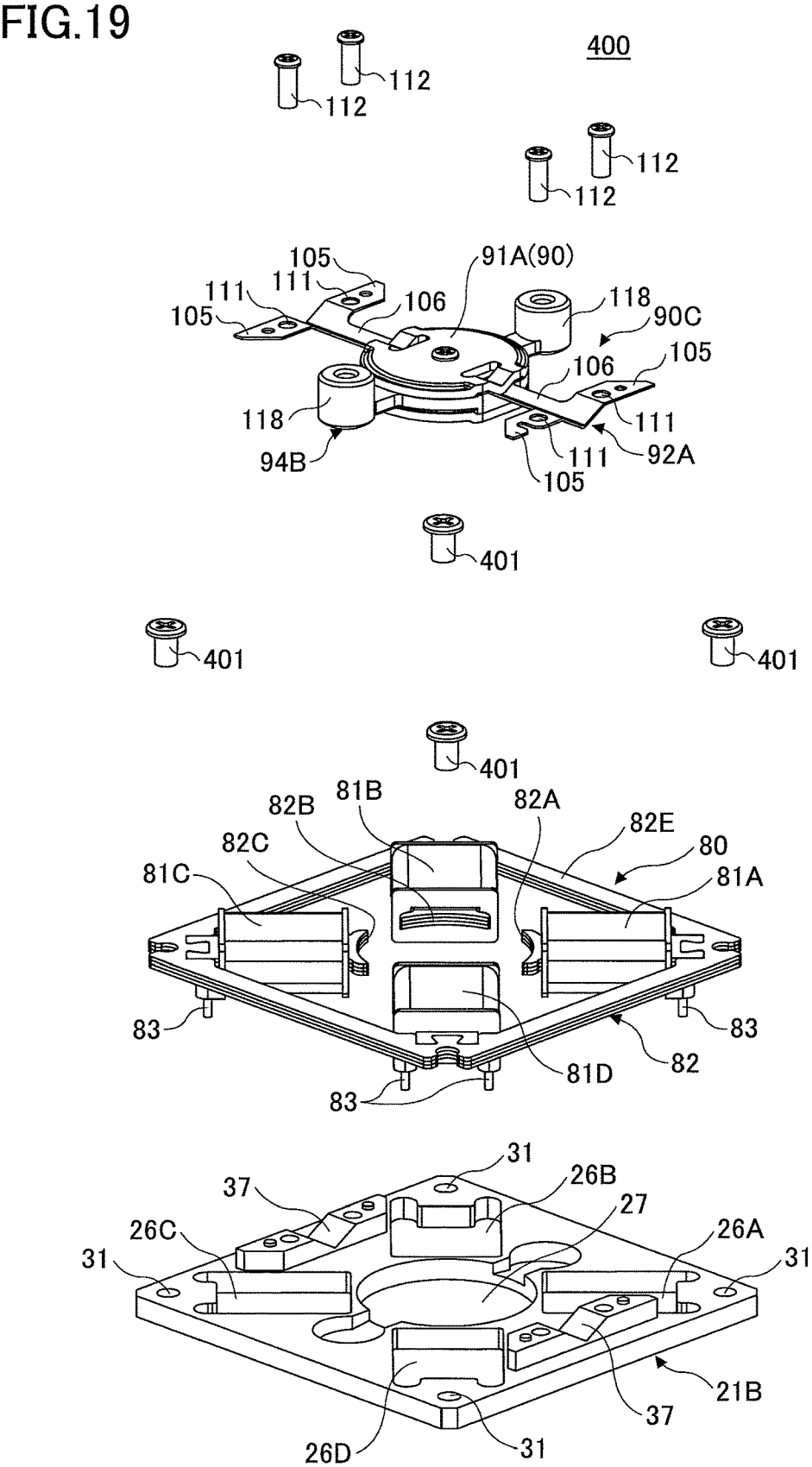
FIG. 19 is an exploded perspective view of the actuator disposed in the pump as the third embodiment.

FIG. 16 to FIG. 19 are diagrams for illustrating the pump 300. FIG. 16 is a cross-sectional view of the pump 300; FIG. 17 is a perspective view of the actuator 400 disposed in the pump 300; FIG. 18 is a cross-sectional view of the actuator 400; and FIG. 19 is an exploded perspective view of the actuator 400. Note that the same numerical codes are assigned to elements in FIG. 16 to FIG. 19 as in FIG. 1 to FIG. 8 for the corresponding elements of the power generator 10 according to the first embodiment, and their description is omitted.

The pump 300 is a compression pump that takes in the air from a suction mouth 321-1, compresses the air, and discharges the compressed air from an outlet 324. This pump 300 includes a case 320, a movable object 326, and the actuator 400.

The case 320 has an air-tight structure, and includes a case body 321, a top cover 322, and an intermediate plate 323. The case body 321, the top cover 322, and the intermediate plate 323 are all formed by resin molding.

The case body 321 has a shape having an opening formed at an upper part, and a bottom portion. Also, on a side wall of the case body 321, a suction mouth 321-1 is formed to take in the air.

The top cover 322 is disposed so as to cover the opening at the upper part of the case body 321. At the center of the top cover 322, the outlet 324 is formed to discharge the compressed air. Also, at a lower part of the outlet 324, a valve mount portion 325 is formed to which a first discharge valve 334 and the second discharge valve 335 of the movable object 326, which will be described later, are mounted.

The intermediate plate 323 is disposed so as to cover the upper part opening of the case body 321. This intermediate plate 323 has an opening formed into which first and second diaphragm portions 327-238 of the movable object 326, which will be described later, are inserted and mounted. The top cover 322 described above is disposed over the intermediate plate 323 in a state having the movable object 326 interposed.

The movable object 326 is disposed between the intermediate plate 323 and the top cover 322. The movable object 326 is formed of an elastic body such as rubber, and includes the first diaphragm portion 327, the second diaphragm portion 328, a center support portion 332, the first discharge valve 334, the second discharge valve 335, a first coupling portion 337, a second coupling portion 338, and a valve contacting portion 336.

The first diaphragm portion 327 forms a first compression chamber 341 in the case 320. Also, the second diaphragm portion 328 forms a second compression chamber 342 in the case 320. The first diaphragm portion 327 has a first intake valve 330 formed at the center, and the second diaphragm portion 328 has a second intake valve 331 formed at the center.

The center support portion 332 is formed between the first diaphragm portion 327 and the second diaphragm portion 328. This center support portion 332 is supported by the intermediate plate 323.

The first diaphragm portion 327 has the first coupling portion 337 disposed downwards, and the second diaphragm portion 328 has the second coupling portion 338 disposed downwards. Lower end portions of these first and second coupling portions 337-338 are coupled with coupling portions 118 of the actuator 400, respectively.

The first coupling portion 337 and the second coupling portion 338 have communication paths 339-340 formed, respectively. The communication path 339 is a path that has the suction mouth 321-1 communicate with the first compression chamber 341. Also, the communication path 340 is a path that has the suction mouth 321-1 communicate with the second compression chamber 342.

The communication path 339 has the first intake valve 330 disposed at the upper end, and by opening the first intake valve 330, the suction mouth 321-1 and the first compression chamber 341 transition to a state to communicate with each other. Also, the communication path 340 has the second intake valve 331 disposed at the upper end, and by opening the second intake valve 331, the suction mouth 321-1 and the second compression chamber 342 transition to a state to communicate with each other.

The first discharge valve 334 and the second discharge valve 335 are disposed in a standing position upwards from the upper surface of the center support portion 332. Also, the valve contacting portion 336 is disposed in a standing position on the upper surface of the center support portion 332 between the first discharge valve 334 and the second discharge valve 335.

The first and second discharge valves 334-335 are configured to be displaced so as to air-tightly contact the inner wall of the valve mount portion 325, and to air-tightly contact the circumference wall of the valve contacting portion 336.

By having the first discharge valve 334 contact the circumference wall of the valve contacting portion 336, the first compression chamber 341 communicates with the outlet 324, and by having the first discharge valve 334 contact the inner wall of the valve mount portion 325, the first compression chamber 341 is cut off from the outlet 324.

Also, by having the second discharge valve 335 contact the circumference wall of the valve contacting portion 336, the second compression chamber 342 communicates with the outlet 324, and by having the second discharge valve 335 contact the inner wall of the valve mount portion 325, the second compression chamber 342 is cut off from the outlet 324.

The actuator 400 drives the first coupling portion 337 and the second coupling portion 338 in the up and down directions (the directions of the arrows Z1-Z2). As illustrated in FIG. 17 to FIG. 19, the actuator 400 includes a case body 21B, a coil unit 80, and a magnet unit 90C. The actuator 400 according to the embodiment does not have a top cover 22 and a switch unit 40 disposed, which is different from the power generator 10 according to the first embodiment. Therefore, the coil unit 80 is directly fixed to the case body 21B by using fixing screws 401.

The magnet unit 90C is configured in the same way as is the magnet unit 90A in the first embodiment except a the movable member 94B. Although the magnet unit 90A has the hook portion 103 disposed that is operated by the switch unit 40 (see FIG. 6), the movable member 94B disposed in the embodiment has, instead of the hook portion 103, the coupling portions 118 disposed that are coupled with the first and second coupling portions 337-338, respectively.

The actuator 400 has the movable member 94B rotate alternately in the directions designated by the arrows B1 and B2 in the figure, by having an alternating current flow in coils 81A-81D at predetermined cycles. Therefore, the coupling portions 118 disposed on the movable member 94B also move up and down alternately.

If the movable member 94B rotates in the direction of the arrow B1, the first coupling portion 337 is moved and biased downwards, and the first diaphragm portion 327 is displaced to have the volume of the first compression chamber 341 increase. Thus, negative pressure is generated in the first compression chamber 341, the first intake valve 330 opens, and the first discharge valve 334 transitions to a state contacting the inner wall of the valve mount portion 325. Thus, the first diaphragm portion 327 takes the air into the first compression chamber 341 from the suction mouth 321-1 via the communication path 339.

Also, if the movable member 94B rotates in the direction of the arrow B1, the second coupling portion 338 is moved and biased upwards, and the second diaphragm portion 328 is displaced to have the volume of the second compression chamber 342 decrease. Thus, the pressure increases in the second compression chamber 342, the second intake valve 331 closes, and the second discharge valve 335 transitions to a state contacting the outer wall of the valve contacting portion 336. Thus, the second coupling portion 338 discharges the air compressed in the second compression chamber 342 from the outlet 324.

Note that if the movable member 94B rotates in the direction of the arrow B2, operations opposite to the above are performed; the first coupling portion 337 discharges the air compressed in the first compression chamber 341 from the outlet 324, and the second diaphragm portion 328 takes the air into the second compression chamber 342 from the suction mouth 321-1 via the communication path 340.

Even if the actuator 400 is used as the drive source of the pump 300 as in the embodiment, the V-shaped spring portions 106 of the spring member 92A are set to have a V-shape as in the power generator 10 according to the first embodiment, it is possible to prevent unnecessary movement of the movable member 94B, and to drive the movable object 326 (the first diaphragm portion 327 and the second diaphragm portion 328) precisely. Also, by having the spring member 92A fixed to the case body 221 at both ends, it is possible to increase precision of the rotational center of the movable member 94B, and to prevent generation of noise.

Note that in the actuator 400 according to the embodiment, the yoke 91, the magnet 93, and the movable member 94B that can move while generating power (the movable objects), vibrate at a resonance frequency Fr calculated by the following formula (4) where J represent the moment of inertia of the movable objects, and KSP represents the spring constant in the torsional direction of the V-shaped spring portions 106 around the axis MX as the center.

$$Fr = \frac{1}{2\pi}\sqrt{\frac{K_{sp}}{J}} \quad (4)$$

Also, the actuator 400 according to the embodiment is driven based on an equation of motion represented by the following formula (5), and a circuit equation represented by the following formula (6).

$$J\frac{d^2\theta(t)}{dt^2} = K_t i(t) - K_{sp}\theta(t) - D\frac{d\theta(t)}{dt} - T_{Load} \quad (5)$$

J: moment of inertia [kgm²]
θ(t): angle [rad]
$K_t$: torque constant [Nm/A]
i(t): current [A]
$K_{sp}$: spring constant [Nm/rad]
D: attenuation constant [Nm/(rad/s)]
$T_{Load}$: load torque [Nm]

$$e(t) = Ri(t) + L\frac{di(t)}{dt} + K_e\frac{d\theta(t)}{dt} \quad (6)$$

e(t): input voltage [V]
R: resistance [Ω]
L: inductance [H]
$K_e$: counter electromotive force constant [V/(rad/s)]

In other words, if an electromagnetic converter according to the present invention is used for the actuator 400, an optimum resonance frequency can be set in accordance with the magnitude of inertia, and hence, degrees of freedom for the design can be increased.

So far, preferred embodiments of the present invention has been described in detail. Note that the present invention is not limited to the specific embodiments described above, but various variations and modifications may be made within the scope of the present invention described in claims.

What is claimed is:

1. An electromagnetic converter that converts kinetic energy to electric energy, or converts electric energy to kinetic energy, the electromagnetic converter comprising:
   a core attached to a rectangular-shaped frame so as to protrude inwardly and configured to have a coil disposed;
   a magnet being a single-pole, disk-shaped magnet and configured to be magnetically coupled with the core;

a yoke including an upper yoke and a lower yoke and configured to have the magnet disposed, said upper yoke and lower yoke being formed of magnetic metal;

a fixing portion configured to have the core and the yoke placed; and an elastic member configured to support the yoke, and to elastically deform so as to displace the magnet with respect to the core, wherein both ends of the elastic member are fixed to the fixing portion, wherein the magnet and the yoke can rotate around an axis in an extending direction of the elastic member.

2. The electromagnetic converter as claimed in claim 1, wherein the elastic member is formed to have a V-shape.

3. The electromagnetic converter as claimed in claim 2, wherein the elastic member is formed to have the V-shape having an angle between 90° and 120°.

4. The electromagnetic converter as claimed in claim 1, wherein the elastic member includes a plurality of plate spring members.

5. The electromagnetic converter as claimed in claim 2, wherein the fixing portion is formed to have a V-shaped portion corresponding to the shape of the elastic member, at a position where the elastic member is fixed.

6. The electromagnetic converter as claimed in claim 1, wherein the yoke is placed to have the magnet interposed.

7. An actuator, comprising:
the electromagnetic converter as claimed in claim 1, as a drive source of the actuator.

8. A pump, comprising:
the actuator as claimed in claim 7, installed in the pump.

* * * * *